(12) United States Patent
Kalhan

(10) Patent No.: US 8,483,692 B2
(45) Date of Patent: Jul. 9, 2013

(54) METHOD AND SYSTEMS FOR ALLOCATING TRANSMISSION OF COMMON CONTROL INFORMATION FROM MULTIPLE BASE STATIONS

(75) Inventor: Amit Kalhan, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 301 days.

(21) Appl. No.: 12/852,214

(22) Filed: Aug. 6, 2010

(65) Prior Publication Data

US 2012/0034924 A1 Feb. 9, 2012

(51) Int. Cl.
*H04W 36/00* (2009.01)

(52) U.S. Cl.
USPC .......................................... 455/444; 370/338

(58) Field of Classification Search
USPC .......................................... 455/444; 370/338
See application file for complete search history.

(56) References Cited

U.S. PATENT DOCUMENTS

| | | | |
|---|---|---|---|
| 2005/0111430 A1* | 5/2005 | Spear et al. | 370/345 |
| 2006/0019665 A1* | 1/2006 | Aghvami et al. | 455/444 |
| 2009/0252075 A1 | 10/2009 | Ji et al. | |
| 2009/0257390 A1 | 10/2009 | Ji et al. | |
| 2010/0034163 A1* | 2/2010 | Damnjanovic et al. | 370/329 |
| 2011/0170496 A1* | 7/2011 | Fong et al. | 370/329 |

FOREIGN PATENT DOCUMENTS

EP 1594330 A1 11/2005

OTHER PUBLICATIONS

QUALCOMM Europe: "Carrier Aggregation in Heterogeneous Networks", 3GPP Draft; R1-090357, 3rd Generation Partnership Project (3GPP), Mobile Competence Center, 650, Route Des Lucioles, F-06921 Sophia-Antipolis Cedex; France, No. Ljubjians; 20090108, Jan. 8, 2009, XP050318263.
QUALCOMM Europe: "notion of Anchor Carrier in LTE-A", 3GPP Draft; R1-090860, 3rd Generation Partnership Project (3GPP), Mobile Competence Center, 650, Route Des Lucioles, F-06921 Sophia-Antipolis Cedex; France, No. Athens, Greece; 20090203, Feb. 3, 2009, XP050318710.

* cited by examiner

*Primary Examiner* — Marcos Batista

(57) ABSTRACT

A communication system includes at least a large service area (LSA) base station having a LSA geographical service area and a small service area (SSA) base station having a SSA geographical service area that is smaller than the LSA geographical service area and at least partially overlaps the LSA geographical service area in an overlap region. A first logical control channel, assigned to the LSA base station, and a second logical control channel, assigned to the SSA base station, have common control information that is the same. A controller in the system allocates transmission of the common control information from at least one of the base stations over a physical channel having a defined transmission time and transmission frequency. If transmission of the common control information is allocated from both base stations, the common control information is allocated for transmission by both base stations over the physical channel.

26 Claims, 16 Drawing Sheets

METHOD AND SYSTEMS FOR ALLOCATING TRANSMISSION OF COMMON CONTROL INFORMATION FROM MULTIPLE BASE STATIONS

RELATED APPLICATIONS

The application is related to U.S. patent application Ser. No. 12/852,276 entitled "TRANSMISSION OF SYNCHRONIZATION INFORMATION IN A HETEROGENEOUS WIRELESS COMMUNICATION", filed concurrently with this application, and incorporated by reference in its entirety herein.

BACKGROUND

The invention relates in general to wireless communication systems and more specifically to control signals in a wireless communication system.

Base stations in cellular communication systems provide communications services to wireless communication devices within geographical cells where each base station exchanges signals with wireless communication devices within an associated cell. The size and shape of each cell and, therefore, the coverage area of the base station are determined by several factors and are at least partially based on design parameters of the base station. In addition to large macro cells that provide services to numerous devices within relatively large geographical areas, some cellular communication systems are increasingly employing smaller cells to increase efficiency, improve coverage, improve the quality of service, and provide additional services. The smaller cells may include a variety of sizes typically referred to as microcells, picocells and femtocells. Microcells and picocells are often implemented within office buildings, shopping centers and urban areas in order to provide additional security, higher user capacity for the area, additional service features, and/or improved quality of service. Femtocells have relatively smaller geographical areas and are typically implemented at residences or small office locations. Since typical cellular backhaul resources may not be available in these locations, femtocells are sometimes connected to the cellular infrastructure through DSL or cable modems. Femtocells are part of the cellular network and, therefore, communicate with the wireless devices using the same techniques as those used by macrocells. The proximity of the various base stations and wireless communication devices often results in interference. In addition to interference of data communications, control channels may also suffer performance degradation due to interference. Further, identical control information is often transmitted by multiple base stations.

SUMMARY

A communication system includes at least a large service area (LSA) base station having a LSA geographical service area and a small service area (SSA) base station having a SSA geographical service area that is smaller than the LSA geographical service area and at least partially overlaps the LSA geographical service area in an overlap region. The LSA base station is configured to provide wireless service to first mobile communication devices which includes exchanging communication data. The LSA base station is assigned a first logical control channel comprising first control information corresponding to the first mobile communication devices. The SSA base station is configured to provide wireless service to second mobile communication devices which includes exchanging other communication data. The SSA base station is assigned a second logical channel comprising second control information corresponding to the second mobile communication devices. The first logical channel and the second logical channel also comprise common control information that is common to both the first logical channel and the second logical channel. A controller in the system allocates transmission of the common control information from at least one of the base stations over a physical channel having a defined transmission time and transmission frequency. If transmission of the common control information is allocated from both base stations, the common control information is allocated for transmission by the LSA base station and the SSA base station over the same physical channel.

DETAILED DESCRIPTION

The exemplary embodiments discussed below provide efficient allocation of resources for downlink transmission of control information in heterogeneous network systems where mobile wireless communication devices are capable of receiving downlink signals from multiple base stations. In addition to selecting appropriate base stations for transmission of identified control information, the techniques allow for simultaneous transmission of control information from multiple base stations within a physical channel.

Figure 1A:
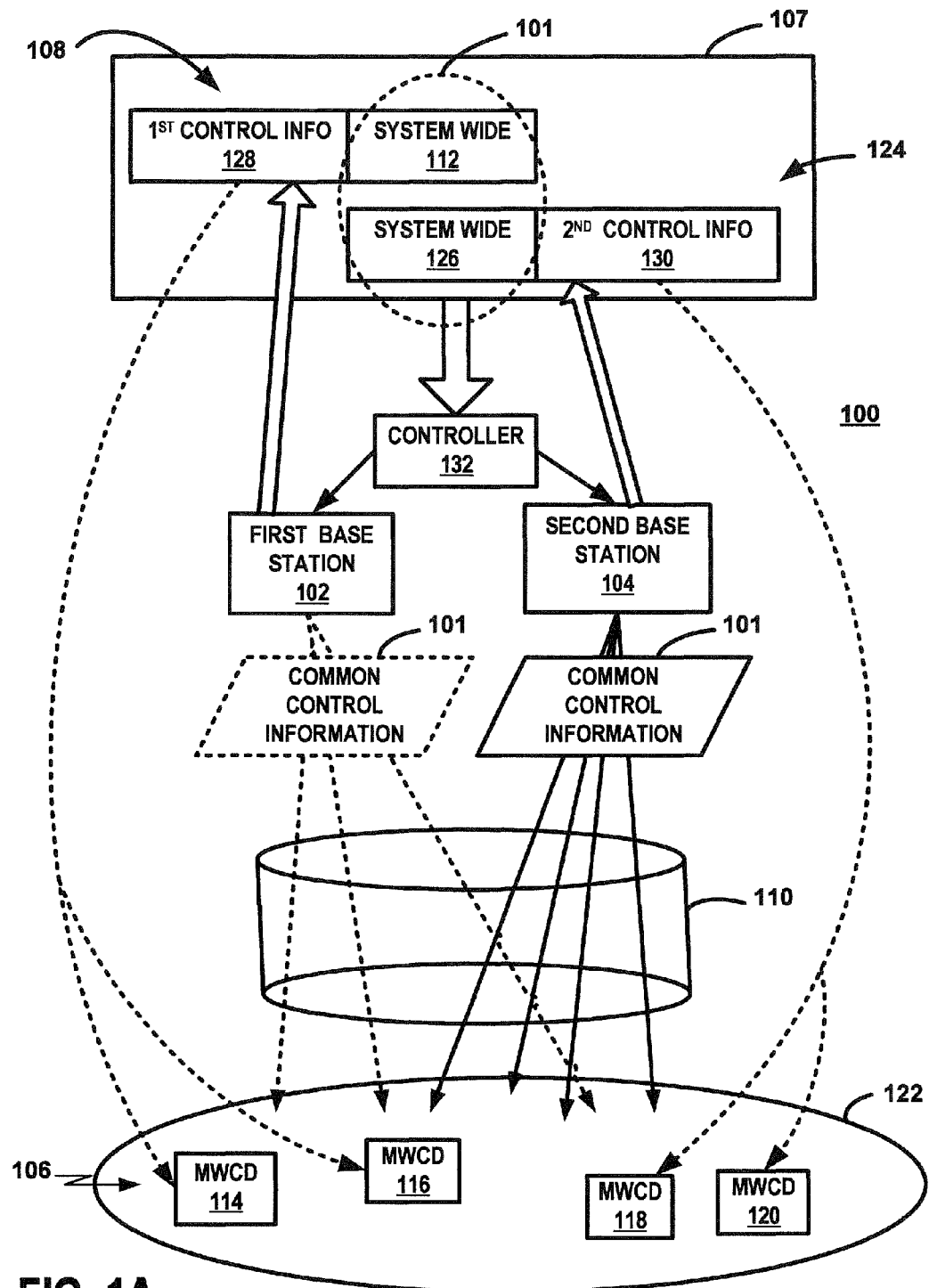
FIG. 1A is a block diagram of a communication system where common control information is transmitted from at least one of two base stations.

FIG. 1A is a block diagram of a communication system where common control information 101 is transmitted from at least one of two base stations 102, 104. The communication system 100 may be implemented in accordance with any of numerous technologies and communication standards. For the examples discussed below, the system 100 operates in accordance with an orthogonal frequency division multiplex (OFDM) standard. The various functions and operations of the blocks described with reference to the communication system 100 may be implemented in any number of devices, circuits, and/or elements as well as with various forms of executable code such as software and firmware. Two or more of the functional blocks in the figures may be integrated in a single device and the functions described as performed in any single device may be implemented over several devices.

The system 100 includes at least two base stations 102, 104 and a wireless communication device. In most circumstances, several base stations are connected to a network controller through network infrastructure to provide wireless communication services to multiple wireless communication devices 106. The mobile wireless communication devices 106 may be referred to as mobile devices, wireless devices, wireless communication devices, and mobile wireless devices as well as by other terms. The wireless communication devices 106 include electronics and code for communicating with the base stations and include devices such as cell phones, personal digital assistants (PDAs), wireless modem cards, wireless modems, and laptop computers as well as other devices. For identification purposes, the base stations are referred to as a first base station 102 and a second base station 104. The base stations 102, 104 include wireless transceivers that exchange wireless signals with the wireless communication devices 106. Transmissions from the base stations and from the wireless communication devices 106 are governed by a communication specification that defines signaling, protocols, and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from a base station to a wireless communication device. The control channel includes a logical broadcast control channel 107 as well as device-specific logical control channels (not shown in FIG. 1A). As discussed in further detail below, a first logical control channel 108 associated with the first base station 102 is transmitted over a physical channel 110, where the transmission may be from the first base station 102, from the second base station 104, or from multiple base stations 102, 104. In an OFDM based system, a physical channel can be defined by allocating specific frequency-time resources. The granularity of these resources depends on the specification and design of the system. Although a particular implementation may further specify frequency, timing, and coding parameters for each base station and/or wireless communication device, conventional systems assume that only the base station transmits control data within the defined control channel between the base station and the wireless communication device exchanging data with that particular base station. Further, in conventional systems, the logical control channel corresponding to a base station is transmitted over a physical channel from that base station but only from that base station. The information transmitted over physical channels from base stations having overlapping service areas often includes common information that is the same in both transmissions in these conventional systems resulting in an inefficient use of resources.

In the examples discussed herein, however, at least a portion 112 of the logical control channel 108 corresponding to the first base station 102 may be transmitted by another base station 104 over the physical channel 110. The channel structure allows efficient allocation of physical resources. For example, some wireless communication devices 114, 116, 118, 120 receiving data from different base stations 102, 104 are within an overlap region 122 of the service areas of both base stations 102, 104. By managing the physical control channels from both base stations 102, 104, common information 101 can be sent by only one of the base stations 104 or may be transmitted by both base stations 102, 104 using intelligent coordination between the two base stations with respect to resources such as time, frequency, codes, and power. Thus, selection of the base station for transmitting particular control information allows for efficient use of the downlink physical resources of both base stations. Accordingly, the additional flexibility allows intelligent use of the resources by taking advantage of mobile communication devices that are within the downlink transmission ranges of multiple base stations. As discussed below, additional efficiencies can be gained by managing the transmission of device-specific control channels from the base stations in addition to managing transmission of common control channels.

The first base station 102 has a first logical control channel 108 and the second base station 104 has a second logical control channel 124. The information within the logical channels 108, 124 and the structure of the logical channels 108, 124 are in accordance with the communication specification governing the operation of the communication system 100. For the example, each logical control channel includes system wide information 112, 126 as well as information 128, 130 unique to the particular base station 102, 104. Therefore, in addition to the system wide information 112, 126, the first logical control channel 108 includes first control information 128 corresponding to mobile communications only associated with the first base station 102. The second logical control channel 124 includes the system wide information 126 and second control information 130 corresponding to mobile communications with the second base station 104. The system wide information 112 in the first logical channel 108 is identical to the system wide information 126 in the second logical channel 124 for the examples discussed herein. The mobile communications with a base station may include data communications and control information and may include downlink transmissions to mobile communication devices associated with the base station (serving base station) as well as mobile communication devices not yet associated with the base station (non-serving base station). All mobile communication devices are registered with the network for the examples discussed herein. For example, a mobile communication between the first base station 102 and a mobile communication device 114 may include a resource description of a time-frequency resource carrying particular control information required by a mobile communication device 114 entering the service area (not shown in FIG. 1A) to acquire service from the first base station 104. The dashed lines extending from the box representing the first control information 108 to the wireless communication devices 114, 116 and from the box representing the second control information 130 to the wireless communication devices 118, 120 in FIG. 1A represent the relationship between the base station specific control information and the corresponding mobile communication devices requiring the base station specific control information. For the example of FIG. 1A, first mobile communication devices 114, 116 are in data communication with the first base station 102 and second mobile communication devices 118, 120 are in data communication with the second base station 104. The first control information 128 may include control information that is unique to the wireless communication devices 114, 116 associated with the first base station 102 and is different from the second control information 130. Also, the second control information 130 is unique to the wireless communication devices 118, 120 and is different from the first control information 128.

As described in further detail with reference to FIG. 3A and FIG. 3B, the first base station 102 has a geographical service area that at least partially overlaps a geographical service area of the second base station. The first mobile communication devices 114, 116 and the second mobile communication devices 118, 120 are within the overlap region 122 of the two services areas. Accordingly, all the mobile communication devices 114, 116, 118, 120 within the overlap region 122 can receive signals from both base stations 102, 104.

As mentioned above, the system wide information 112 in the first logical control channel 108 and the system wide information 126 in the second logical control channel 124 are the same. Accordingly, the two logical channels include common control information 101. As used herein, the "common control information" is not related to the common control channel as used in some communication specifications. Accordingly, as used herein, "common control information" refers the information in the logical control channels that is the same.

Figure 1B:
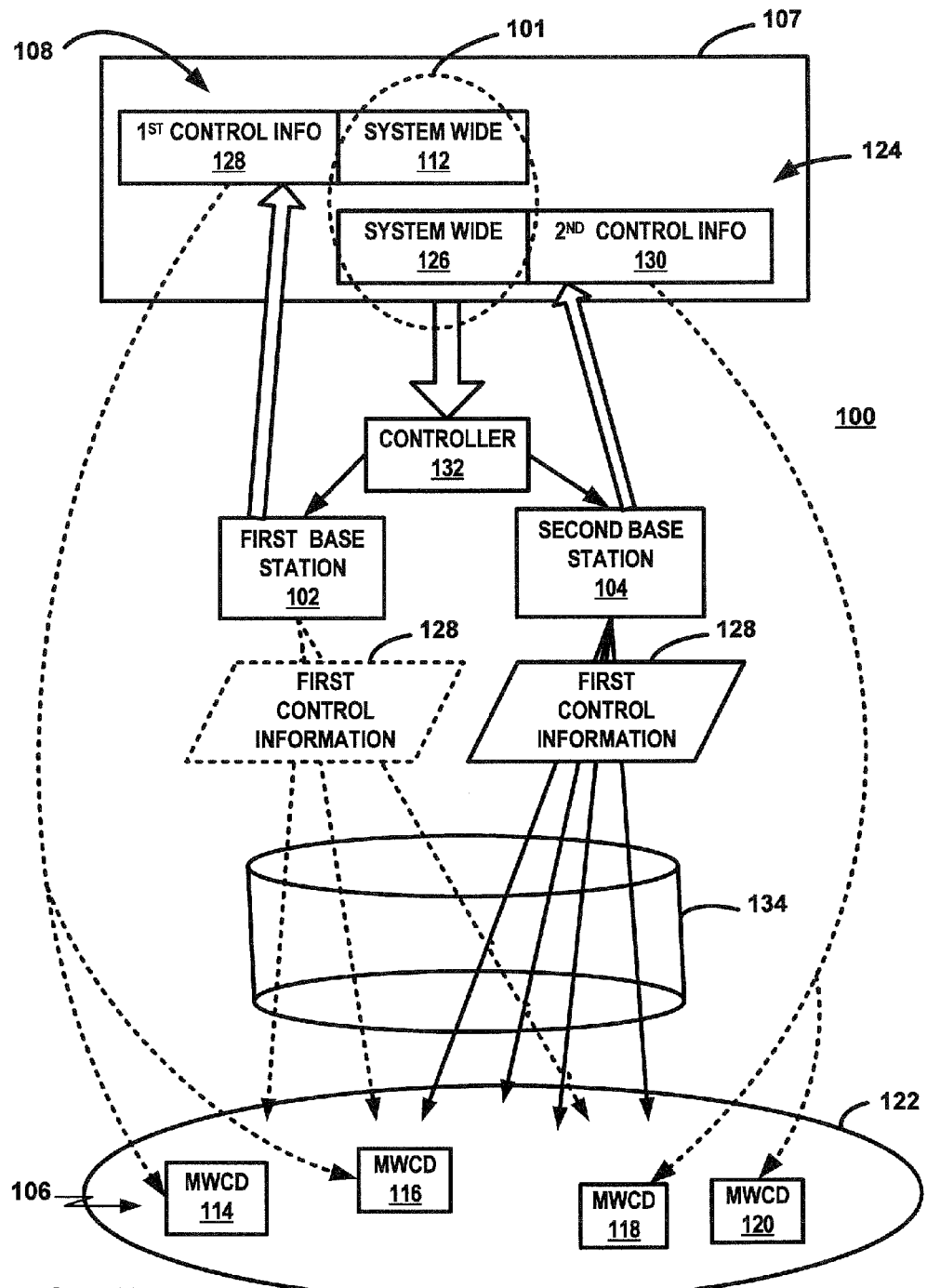
FIG. 1B is a block diagram of the communication system where the first control information is transmitted from at least one of two base stations.
Figure 1C:
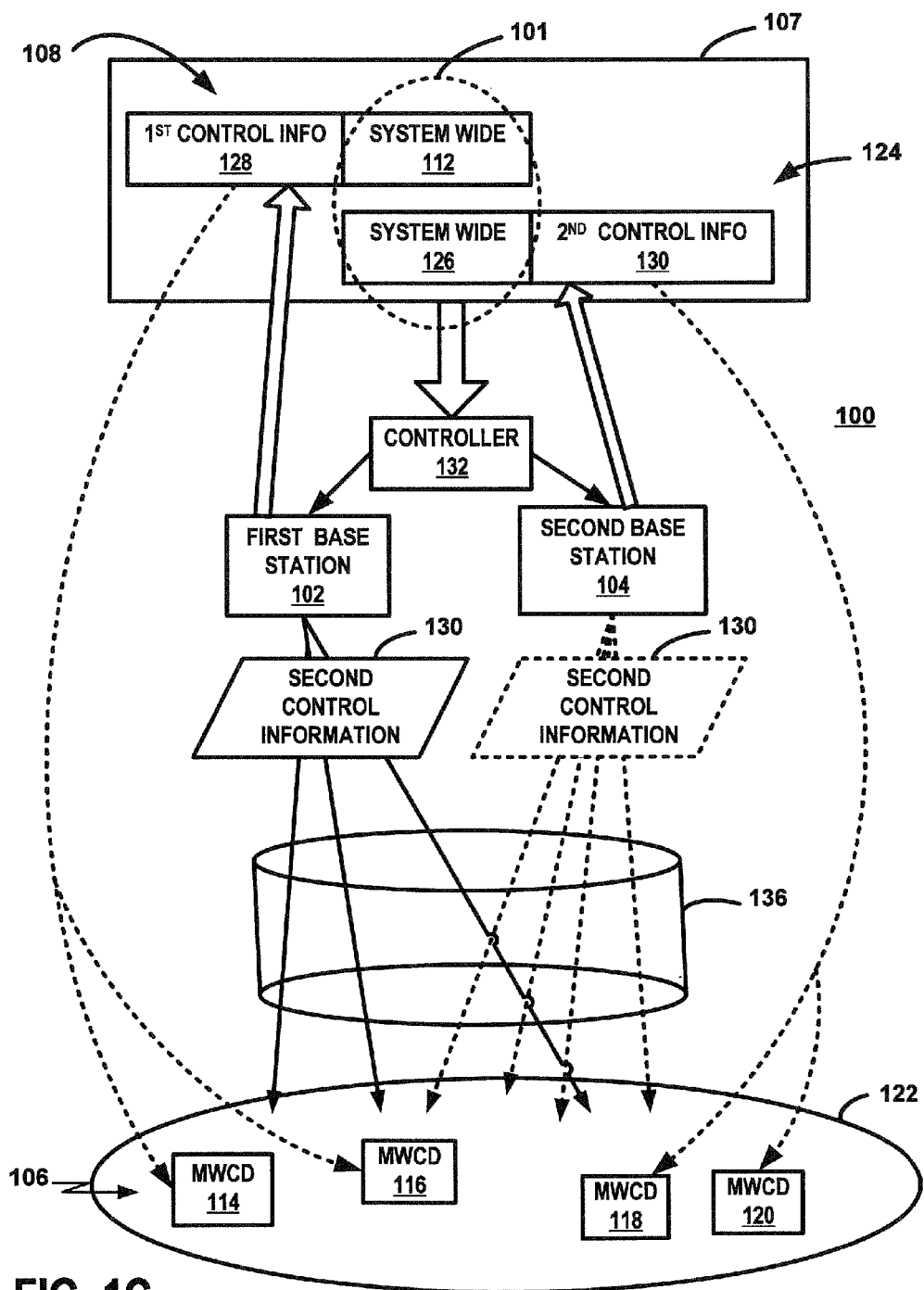
FIG. 1C is a block diagram of the communication system where the second control information is transmitted from at least one of two base stations.

The controller 132 is any combination of hardware, software and/or firmware that performs the described functions. The controller 132 may be located in one of the base stations 102, 104, in the core network (not shown), or may be distributed over the core network and/or base stations 102, 104. Accordingly, one or more devices that may or may not be collocated may perform the functions described as performed by the controller 132. For the example, the controller 132 is within the core network and communicates with the base stations in accordance with known techniques. The controller 132 indentifies the common control information 101 between the first logical control channel 108 and the second logical control channel 124. The controller 132 schedules, maps, or otherwise designates the physical channels that will be used for transmitting the common control information 101, the first control information 128 and the second control information 130. FIG. 1A shows transmission of the common control information 101. FIG. 1B and FIG. 1C show transmission of the first control information 128 and second control information 130, respectively. Although the transmission of the common control information 101, the first control information 128 and second control information 130, may occur at the same time, the transmissions are illustrated in separate figures in the interest of reducing complexity in the figures and increasing clarity.

The illustrations in FIG. 1A representing the transmission of the common control information 101 from the first base station 102 are drawn using dashed lines to signify that, in some circumstances, the common control information 101 is not transmitted from both base stations. In addition to establishing the time and frequency parameters of the physical channel 110 for transmission of the common control information 101, the controller 132 may also establish relative power levels of the information. As discussed below, the controller 132 weights the subcarriers assigned to transmit the information to select a relative power level of the information. Accordingly, the controller 132 selects a power weighting of the subcarriers for transmitting the common control information 101 from each base station at power weights between a minimum power weighting, where there is no transmission of the information, to a maximum power weight. Any of numerous factors, algorithms, and techniques may be used to determine, whether to transmit the common control information 101 from a particular base station and/or to select the power weighting for the information. Power weighting techniques minimize noise and increase efficiency and capacity of the system. Examples of factors used for determining the power weighting may include signal quality indicators, capacity of the system, and base station loading factors. As discussed below in further detail, for one example, the power weighting is based on a bit error rate (BER) of a combined signal at the wireless communication device where the BER is typically a calculated and predicted value for a wireless communication device within the overlap region 122. Accordingly, for such an implementation, the combined signal is a theoretical signal based on calculations, power levels, attenuation levels and other factors. In some situations, the BER may be a measured BER of a combined signal resulting from actual received signals at a wireless communication device. The measurements may be stored values or may be dynamically processed during operation.

As mentioned above, each base station transmits the same control information over the same physical channel in some situations. Although the same physical channel is used, the base stations may use different scrambling codes for transmission. Accordingly, as discussed herein, a physical channel is a time-frequency physical channel using a particular set of time-frequency resource elements. Two signals transmitted over the same physical channel may include different scrambling. The determination to use different scrambling codes when the same information is transmitted from two base stations depends on several factors such as the length of the codes and the anticipated relative signals strengths of the signals as received at a wireless communication device. For example, where one base station has a coverage area within a building that is located within the coverage area of the other base station, signal loss through the building may be sufficiently high such that the scrambling gain of using different scrambling codes may be adequate to avoid interference. The efficiency of using different scrambling codes is at least partially dependent on the relative power levels of the signals. Where different scrambling codes are used for the two signals, the signals are demodulated and processed separately and then combined. Where the same scrambling code is used, the multiple versions of the simulcast signal are processed by the receiver in the wireless communication device similarly to the processing of reflected signals.

For the examples discussed herein, the same scrambling code is used when the two base stations transmit the same information over the same physical channel. Accordingly, where the first base station 102 and the second base station 104 both transmit the common control information 101 over the physical channel 110, the signals are scrambled using the same code. Although other techniques may be used, the scrambling codes are based on the cell ID of the base station. Therefore, if the first base station 102 and the second base station 104 are simultaneously transmitting the common control information 101, the base station 102 uses a scrambling code based on the cell ID of the other base station 104 in the exemplary embodiment. A common scrambling code can be used for both signals when transmitting common control information on the physical channel. The receiver combines the signals to achieve a higher signal-to-noise ratio than if only one signal is transmitted. The base stations 102, 104 are sufficiently synchronized to minimize errors and noise. The signals are transmitted by both base stations in situations where the signal quality and efficiency is greater than transmitting the information from only one of the base stations.

FIG. 1B is a block diagram of the communication system 100 where the first control information 128 is transmitted from at least one of two base stations. A base station 104 other than the base station (serving base station) in data communication with a wireless communication device 114 may transmit the control information 128 for the wireless communication device even where the control information is not common control information 101. For example, the first control information 128 may be transmitted by the second base station 104 to the wireless communication device 114 that is in data communication with the first base station 102. Since the wireless communication device 114 is within the overlap region 122, the wireless communication device 114 is able to receive control signals transmitted by the second base station 104. The illustrations in FIG. 1B representing the transmission of the first control information 128 from the second base station 104 are drawn using dashed lines to signify that, in some circumstances, the first control information 128 may be transmitted from both base stations 102, 104. The controller 132 designates a second physical channel 134 that will be used for transmitting the first control information 128. A transmission of the first control information 128 is over the second physical channel 134. Where both base stations 102, 104 transmit the first control information 128, signals are simultaneously transmitted over the second physical channel 134. Accordingly, the same information is transmitted over the same physical channel. As discussed above, the signal from one base station may be scrambled differently from the other base station in some situations.

FIG. 1C is a block diagram of the communication system 100 where the second control information 130 is transmitted from at least one of two base stations 102, 104. A base station 102 other than the base station 104 in data communication with a wireless communication device 118 may transmit the control information 130 for the wireless communication device 118 even where the control information is not common control information 101. For example, the second control information 130 may be transmitted by the first base station 102 to the wireless communication device 118 that is in data communication with the second base station 104. Since the wireless communication device 118 is within the overlap region 122, the wireless communication device 118 is able to receive control signals transmitted by the first base station 102. The illustrations in FIG. 1C representing the transmission of the second control information 130 from the first base station 102 are drawn using dashed lines to signify that, in some circumstances, the second control information may be transmitted from both base stations. The controller 132 applies power weightings for each base station for transmitting each of the common control information, the first control information and the second control information. The controller assigns the transmission of the second control information 130 over a third physical channel 136.

Figure 2A:
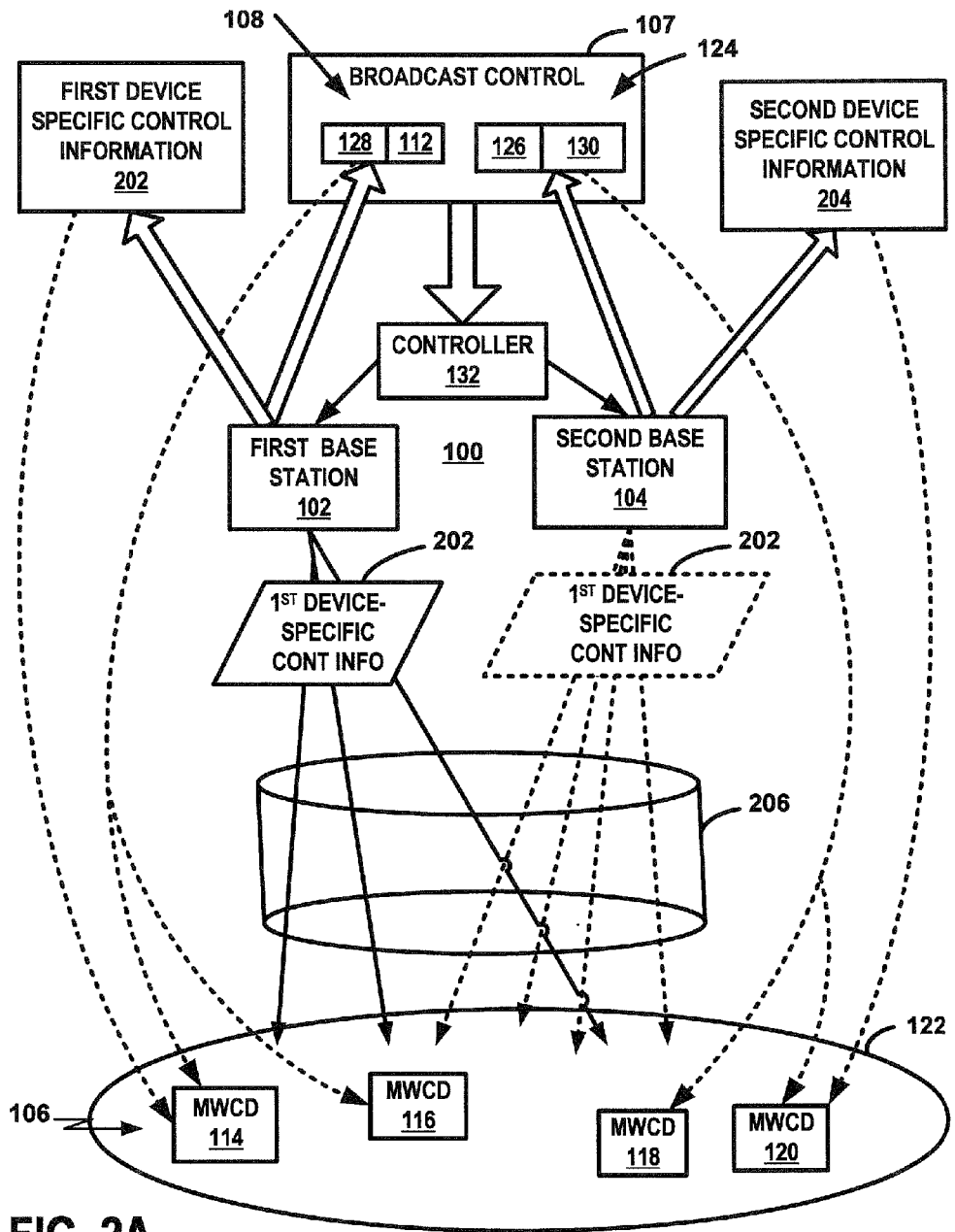
FIG. 2A is a block diagram of the communication system where the first device-specific control information is transmitted from at least one of two base stations.

FIG. 2A is a block diagram of the communication system 100 where the first device-specific control information 202 is transmitted from at least one of two base stations 102, 104. In addition to broadcast control information of the logical broadcast control channel 107, the base stations transmit device-specific control information 202, 204. A base station 104 other than the base station 102 in data communication with a wireless communication device 114 may transmit the device-specific control information 202 for the wireless communication device 114. For example, the first device-specific control information 202 may be transmitted by the first base station 102 and/or the second base station 104 to the wireless communication device 114 that is in data communication with the first base station 102. Since the wireless communication device 114 is within the overlap region 122, the wireless communication device 114 is able to receive control signals transmitted by the first base station 102 and the second base station 104. The illustrations in FIG. 2A representing the transmission of the first device-specific control information 202 from the second base station 104 are drawn using dashed lines to signify that, in some circumstances, the first device-specific control information 202 may be transmitted from one or both of the base stations 102, 104. The controller 132 assigns the transmission of the first device-specific control information 202 over a first physical device-specific control channel 206. The controller 132 establishes power weightings of the signals from each base station for transmitting the device-specific control information. Since the power weightings include a minimum power weighting where there is no transmission, the power weighting may establish that the device specific information is transmitted only from one base station. The controller 132 may determine power weightings based on a reported or a calculated quality of the downlink signal to the wireless communication device. Since the device-specific control information is targeted to a single device, power weightings of the signals may be dynamically adjusted. As discussed below, an example of a physical device-specific control channel 206 includes a resource element or resource block within a Physical Downlink Control Channel (PDCCH) defined by the 3GPP Long Term Evolution (LTE) communication specification.

Figure 2B:
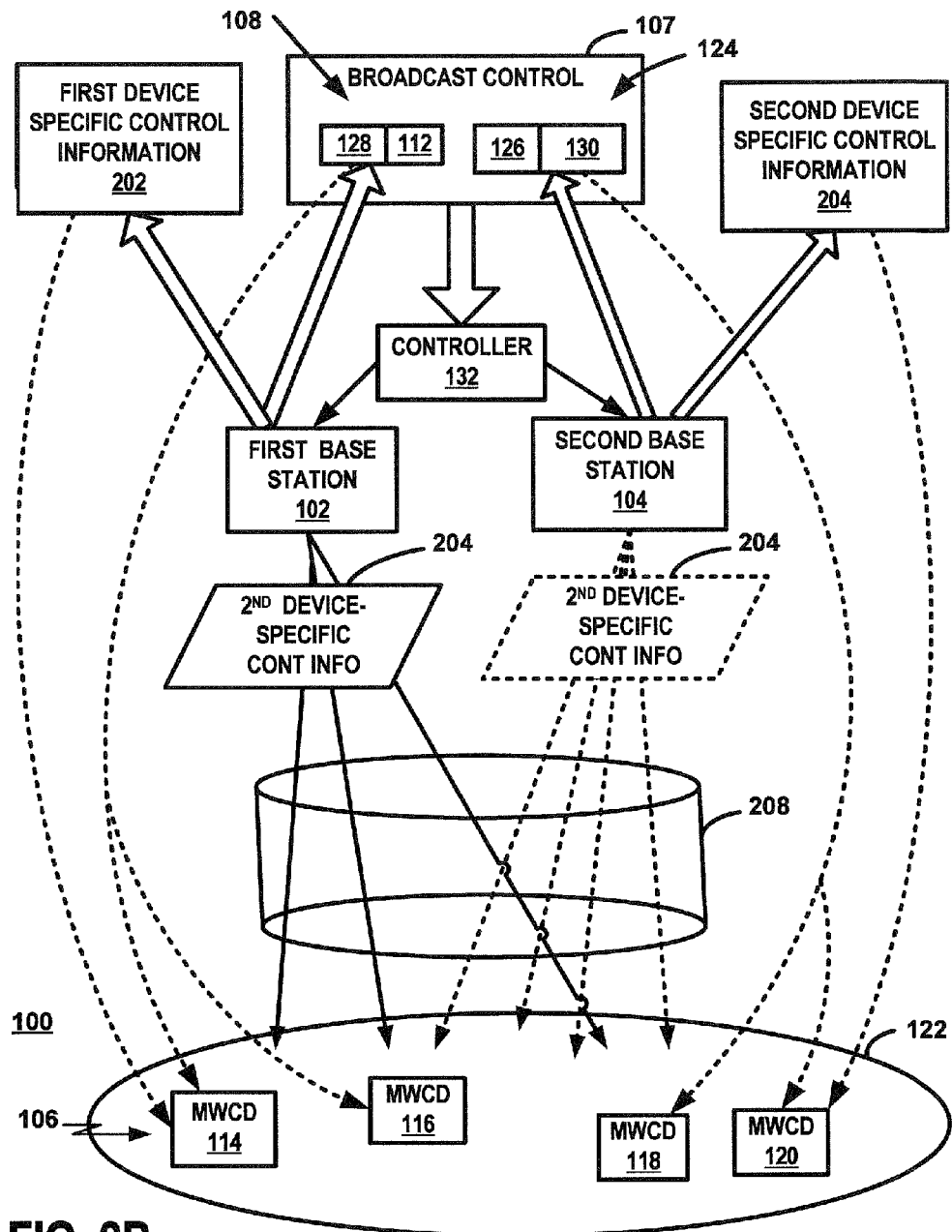
FIG. 2B is a block diagram of the communication system where the second device-specific control information is transmitted from at least one of two base stations.

FIG. 2B is a block diagram of the communication system 100 where the second device-specific control information 204 is transmitted from at least one of two base stations 102, 104. A base station 102 other than the base station 104 in data communication with a wireless communication device 114 may transmit the device-specific control information 204 for the wireless communication device 120. For example, the first device-specific control information 204 may be transmitted by the first base station 104 and/or the second base station 104 to the wireless communication device 120 that is in data communication with the second base station 104. Since the wireless communication device 120 is within the overlap region 122, the wireless communication device 120 is able to receive control signals transmitted by the first base station 102 and the second base station 104. The illustrations in FIG. 2B representing the transmission of the second device-specific control information 204 from the first base station 102 are drawn using dashed lines to signify that, in some circumstances, the second device-specific control information 204 may be transmitted from one or both of the base stations 102, 104. The controller 132 establishes power weightings of the signals from each base station for transmitting the device-specific control information. The controller 132 determines power weightings based on a reported and/or calculated quality of the downlink signal to the wireless communication device. Since the device-specific control information is targeted to a single device, power weightings of the signals may be dynamically adjusted.

Figure 3A:
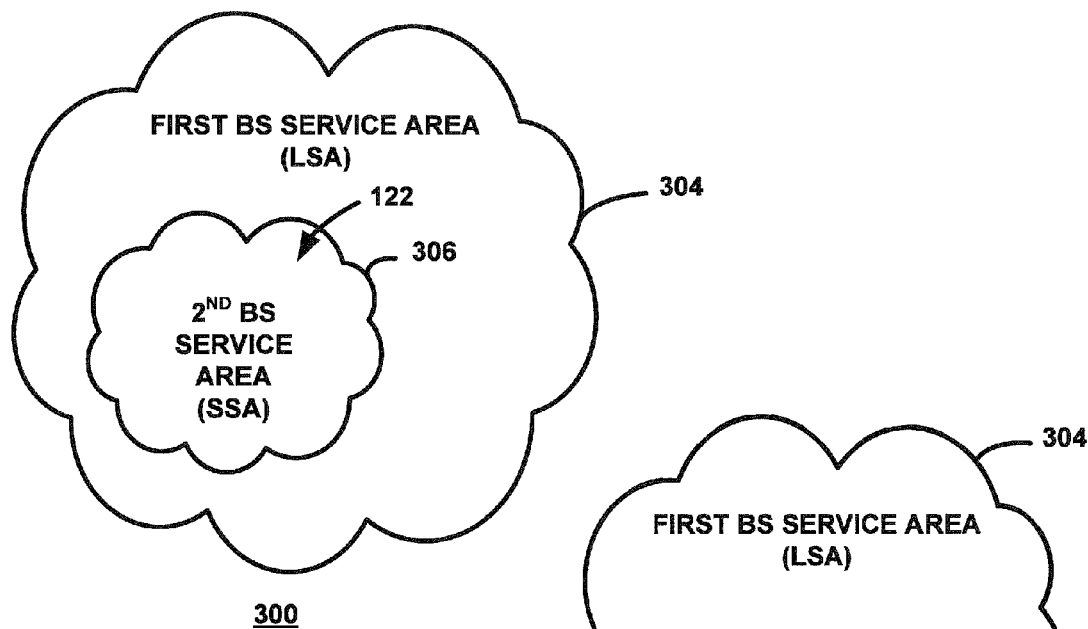
FIG. 3A is a depiction of an exemplary geographical service area relationship provided by the first base station and the second base station where the service area of the second base station is within the service area of the first base station.
Figure 3B:
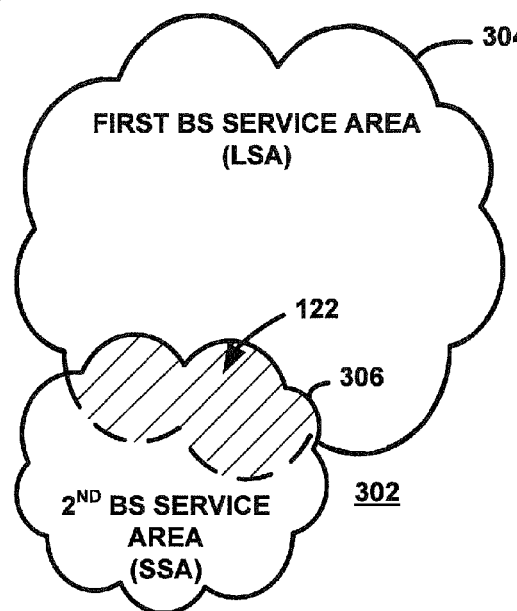
FIG. 3B is a depiction of an exemplary geographical service area relationship provided by the first base station and the second base station where the service area of the second base station overlaps with the service area of the first base station.

FIG. 3A and FIG. 3B are depictions of exemplary geographical service area relationships 300, 302 provided by the first base station 102 and the second base station 104. The first base station 102 is capable of providing wireless service to wireless communication devices within a first base station geographic service area 304 and the second base station 104 is capable of providing wireless service to wireless communication devices within a second station geographical service area 306. Accordingly, a geographic service area is the coverage area of the base station. The second base station geographical service area 306 and the first base station geographic service area 304 may have any of numerous shapes, sizes, and configurations. The clouds representing the service areas generally illustrate the relationships between the service areas and do not necessarily depict the actual shapes of the service areas. Further, the service areas may contain holes of coverage where service is unavailable. In the interest of clarity and brevity, such features are not illustrated in the figures. In FIG. 3A, the service area 306 of the second base station 104 is completely within the service area 304 provided by the first base station 102. Such service area relationships 300 often occur where some base stations within the communication system provide smaller service regions such as microcell, picocell, and femtocell configurations. A femtocell arrangement, for example, may include a femtocell base station (second base station 104) located at a residence where the femtocell is a service area for devices used by device users living at the residence. When the wireless communication devices are outside the service area 306, service is provided by larger macrocells (e.g. first base station 104). When the authorized wireless communication device is at the residence, however, service is provided by the base station presenting the smaller femtocell service area 304. Accordingly, in most situations, the service area 304 of the second base station 102 will be completely within the service area 304 of the first base station 104. In some situations, however the service area 306 may be partially overlapping with the service area 304 as shown in FIG. 3B.

An example of a heterogeneous network system that included multiple sized and overlapping service areas includes systems that operate in accordance with 3GPP LTE communication specification and include one or more of macrocells, microcells, picocells and femtocells. In such systems, the base stations are typically referred to as eNodeBs. Continuing with the example of FIG. 3A and FIG. 3B, therefore, the first base station 102 may be an eNodeB with a geographical service area greater than the geographical service area of an eNodeB that is operating as the second base station 104. Accordingly, a larger service area (LSA) eNodeB, such a macro eNodeB has a larger service area than a smaller service area (SSA) eNodeB such as a Micro eNodeB, Pico eNodeB, or Femto eNodeB. As discussed herein, a larger service area (LSA) base station is any type of base station or eNodeB that provides communication services within a larger service area than a smaller service area (SSA) base station where the SSA base station is any type of base station or eNodeB providing service within the smaller service area.

Figure 4:
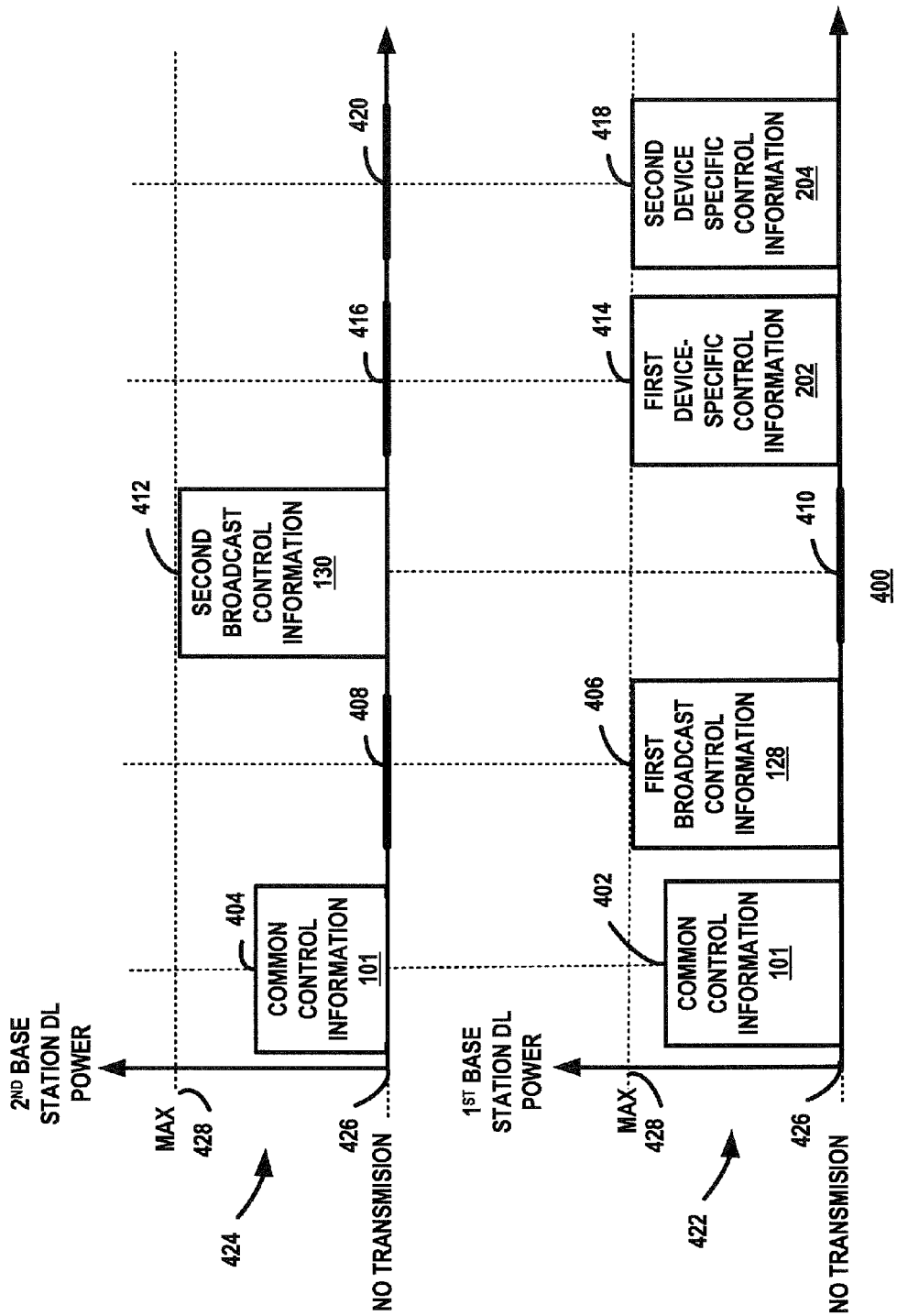
FIG. 4 is a graphical representation of an example of transmission power weightings of the transmissions of the control information from the two base stations.

FIG. 4 is a graphical representation 400 of an example of transmission power weighting 402, 404, 406, 408, 410, 412, 414, 416, 418, 420 of the transmissions 422, 424 of the control information from the two base stations 102, 104. In embodiments discussed herein, a power loading scheme is used to allocate power across the subcarriers. In accordance with OFDM techniques, power is allocated using power-loading techniques where power is increased over some subcarriers and decreased over others while maintaining a constant energy over the full frequency band although the overall power in the full frequency band can also be adjusted, in some circumstances.

The power allocation in power-loading systems can be expressed as $x_i = \alpha_i s_i$ where $\alpha_i$ is a weight on the i-th subcarrier and $s_i$ is the transmitted symbol (complex-valued). The vector $\alpha = [\alpha_1, \alpha_2, \ldots, \alpha_{N-1}, \alpha_N]^T$ is designed to meet the following constraint:

$$E\left[\sum_{i=1}^{N} |\alpha_i \ s_i|^2\right] = \sum_{i=1}^{N} |\alpha_i|^2 E[|s_i|^2] = \varepsilon$$

and, as a result, $$\|\alpha\|_2 = \left(\sum_{i=1}^{N} |\alpha_i|^2\right)^{1/2} = 1$$

Various algorithms are applied to simultaneously adjust the corresponding bit-rate, $R_i$ (e.g. modulation order) and the power parameter, $\alpha_1$, for each subcarrier (or set of subcarriers) to optimize the system performance. Such a process is typically referred to as "loading" in OFDM systems.

Therefore, allocating various weights a, in the frequency-domain allows power to be increased on certain parts of the frequency band while decreased on certain other parts of the frequency band. As mentioned above, however, the total base station (eNodeB) transmission power is fixed. Therefore, if power spectral density is increased on part of the bandwidth, less power is available for the remaining part of the bandwidth.

In typical OFDM based implementations, each base station performs power and bit-rate allocation per subcarrier (or a set of subcarriers) before the inverse fast Fourier transform (IFFT) operation (frequency-domain). Each base station may be assigned a different power level. Therefore, after IFFT operation, digital-to-analog and RF processing, each base station may transmit the signal at a different power level. Such a situation may occur where the base stations provide service in different sized service areas. A larger service area (LSA) base station is typically assigned a higher maximum power level than a smaller service area (SSA) base station. For example, during the final stages of transmission, a power amplifier of a macro base station transmits at 43 dBm and a power amplifier for a pico base station transmits at 30 dBm. The power amplifiers transmit a time-domain based signal where all frequencies are amplified. Due to power-allocation applied during the frequency-domain stage, however, each frequency gets amplified by a different factor. As exemplified herein, therefore, the assignment of a transmission power level (weighting) to control information is at least partially accomplished by shifting power, in the frequency domain, to or from subcarriers used for transmitting the control information. This procedure is referred to herein as subcarrier power weighting.

The graphical representation 400 is most illustrative of power weighting of subcarriers carrying the identified information in the frequency domain before the IFFT operation, amplification, and transmission. Those skilled in the art will recognize the correspondence to the frequency spectrum in the time domain during transmission. In addition, the actual power of the transmitted signals may be further adjusted or determined by other factors. For example, the maximum power level of particular base stations may be limited to achieve a particular geographical coverage mapping. Accordingly, the illustrations in FIG. 4 relate to the subcarrier power weighting which do not necessarily directly correspond to the actual transmitted power from the base stations.

The controller 132 selects a subcarrier power weighting 402, 404 for transmitting the subcarriers that will include the common control information 101 from each base station 102, 104 at power weights between no transmission weight 426, where there is no transmission of the information, to a maximum power weight 428 which is the highest relative weighting. For the example of FIG. 3, therefore, the transmission 422 from the first base station 102 includes a transmission representing common control information 101 that has a power weighting 402 less than the maximum 426. The transmission 424 from the second base station 104 includes a transmission representing the common control information 101 that has a power-weighting 404 less than the maximum 426 but different than the power weighting 402 from the first base station 102.

The controller 132 selects a power weighting 406, 408 for transmitting transmissions that will include the first control information 128 from each base station 102, 104 at power weightings between no transmission weighting 426, where there is no transmission of the information, to a maximum power weighting 428. For the example of FIG. 3, therefore, the transmission 422 from the first base station 102 includes a signal representing the first control information 128 that has a power weighting 402 at the maximum 428. The transmission 424 from the second base station 104 includes a transmission representing the first control information 128 that has a power weighting 408 at the minimum weighting (no transmission). For implementation, the control information may simply be not assigned to a subcarrier to achieve the minimum-power weighting resulting in no transmission of the particular information. Those skilled in the art will recognize that energy may be present on a subcarrier even with a minimum power weighting because of leakage from other subcarriers.

The controller 132 selects a power weighting 410, 412 for transmitting signals that will include the second control information 130 from each base station 102, 104 at power weightings between a minimum power 426, where there is no transmission of the information, to a maximum power weighting 428. For the example of FIG. 4, therefore, the transmission 424 from the second base station 104 that includes a transmission representing the second control information 130 that has a power weighting 412 at the maximum 428. The transmission 422 from the first base station 102 includes a transmission representing the second control information 130 that has a power weighting 410 at the minimum power weighting 426, which in the exemplary embodiment results in no transmission of the information.

The controller 132 select power weighting for transmitting the first device-specific control information 202 and the second device-specific control information 204 from each base station 102, 104 at power weightings between a minimum weighting 426, where there is no transmission of the signal, to a maximum power weighting 428. For the example of FIG. 3, both the first device-specific control information 202 and the second device-specific control information 204 are transmitted by signals in the transmission 422 from the first base station 102 and are not transmitted from the second base station 104. Accordingly, the transmission 424 from the second base station 104 includes transmissions representing the device-specific control information 202, 204 that have power weightings 416, 420 at the minimum power weighting of zero 426 (no transmission). The transmission 422 from the first base station includes signals with power weightings 414, 418 at the maximum power weighting 428.

One example for setting the power weightings for the common control information 101 includes setting the power weighting of the control channel of the SSA area base station as a function of the power weighting of control channel of the LSA base station. The power weightings may be pre-determined to provide static or semi-static settings. Although the function may be any of numerous functions, an example of a suitable function is a linear function such as PWSSA=PWLSA*K, where PWSSA is the power weight of the subcarriers transmitted from the SSA base station, PWLSA is the power weighting of the subcarriers transmitted from the LSA base station, and K is a weighting factor. K can be a constant determined at deployment or may be semi-static where the value of K may be readjusted after deployment depending on conditions. For one example, K is selected to minimize the bit error rate (BER) of a combined signal at a receiver within the overlap region 122 as determined at the time of deployment. If, for example, Y is power level of a combined signal, Y can be represented as Y=a*PWLSA+K*b*PWLSA, where a is the propagation loss anticipated for signals transmitted from the LSA base station and b is the propagation loss anticipated for signals transmitted from the SSA base station. K is selected to achieve a minimum power ($Y_{MIN}$) that results in a maximum acceptable bit error rate (BER). Although other values may be used, a desirable BER is often selected to be less than one percent. Accordingly, K is selected to achieve a Y>$Y_{MIN}$ in order that the BER<1%. The determination of the Y, $Y_{MIN}$, a, b and other factors are performed in accordance with known techniques and may be performed by measurements, calculations, simulations, channel modeling and combinations thereof. Numerous other transmission schemes and power levels can be used based on the particular communication system 100 and situation. Power weightings for system-wide and sector-specific control information are typically determined at the time of system deployment. Power weighting may be dynamic, however, in some situations. In addition to BER, false-detection probabilities can be used to designing the power weighting scheme for synchronization channels and other acquisition channels.

Figure 5:
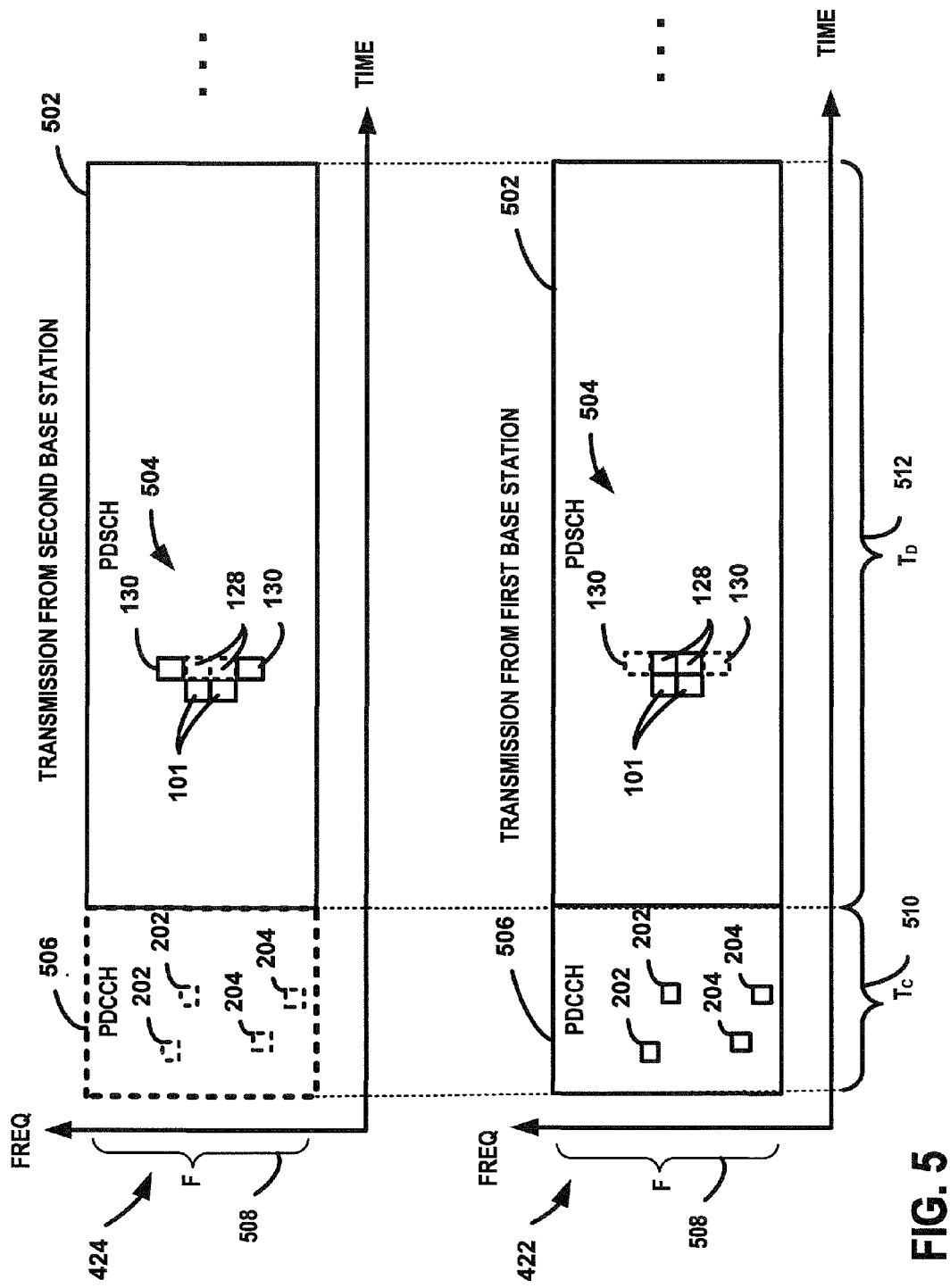
FIG. 5 is a graphical illustration of transmissions from the base stations.

FIG. 5 is a graphical illustration 500 of transmissions 422, 424 from the base stations 102, 104. Time-frequency resources are allocated for transmission of communication data and control data. A data channel 502 is defined in frequency and time and a physical channel 504 is defined within the data channel in frequency and time. Accordingly, the control channel 504 is an example of defined time-frequency resources that can be used for the physical channels 110, 134, 136 discussed above. A device-specific control channel 506 is defined in frequency and time and is an example defined time-frequency resources that can be used for the device-specific physical channels 202, 204 discussed above. The device-specific control channel 506 has a frequency band (F) 508 and is allocated a transmission time period ($T_C$) 410. The data channel 502 is allocated the frequency band (F) 508 and another time period ($T_D$) 412. For the example, the frequency band (F) 508 is divided into multiple orthogonal subcarrier tones in accordance with OFDM techniques. Each channel time period is divided into frames, sub-frames, and symbols in accordance with the communication specification. The resources are further distributed between the wireless communication devices using coding. Symbols and subcarriers in the data channel 502 are allocated to the wireless communication devices. The physical channel 504 is defined within the data channel 502 and frequency-time resources within the physical channel 504 are assigned to the physical channels 110, 134, 136. Such an arrangement is in accordance with the LTE communication specification. For the example of FIG. 5, the data channel 502 is a Physical Downlink Shared Channel (PDSCH), the device-specific control channel 506 is a PDCCH, and the control channel 504 is a Broadcast Control Channel (BCH) all defined in accordance with the 3GPP LTE communication specification.

The common control information 101 is transmitted within the physical channel 110 having the frequency-time resources defined within the control channel 504. The first control information 128 is transmitted within the second physical channel 134 having the frequency-time resources defined within the control channel 504. The second control information 130 is transmitted within the third physical channel 136 having the frequency-time resources defined within the control channel 504. FIG. 5 illustrates an example consistent with the power allocation shown in FIG. 4. For example, the resource elements representing the physical channel 110 with the common control information 101 are represented with sold-line blocks in both transmissions to illustrate that the signals are transmitted from both base stations 102, 104. The resource elements representing the second physical channel 134 with the first control information 128 are represented with sold-line blocks in the first base station transmission 422 and with dashed lines in the second base station transmission 424 to illustrate that the signals are transmitted only from the first base station 102. The resource elements representing the third physical channel 136 with the second control information 130 are represented with sold-line blocks in the second base station transmission 424 and with dashed lines in the first base station transmission 422 to illustrate that the signals are transmitted only from the second base station 104.

Further, the device-specific control information 202, 204 is transmitted by only the first base station 102. Accordingly, the resource elements representing the first physical device specific control channel 206 with the first device-specific control information 202 and the resource elements representing the second physical device-specific control channel 208 are represented with sold-line blocks in the first base station transmission 422 and with dashed lines in the second base station transmission 424 to illustrate that the signals are transmitted only from the first base station 102.

The various frequencies and times shown FIG. 5 are examples of numerous allocation schemes. Resource elements may be allocated in other ways. Resource elements used for a particular channel may be contiguous or noncontiguous. Also, sizes of the blocks shown in FIG. 5 are selected to show a general relationship between the elements do not necessarily to scale.

Figure 6A:
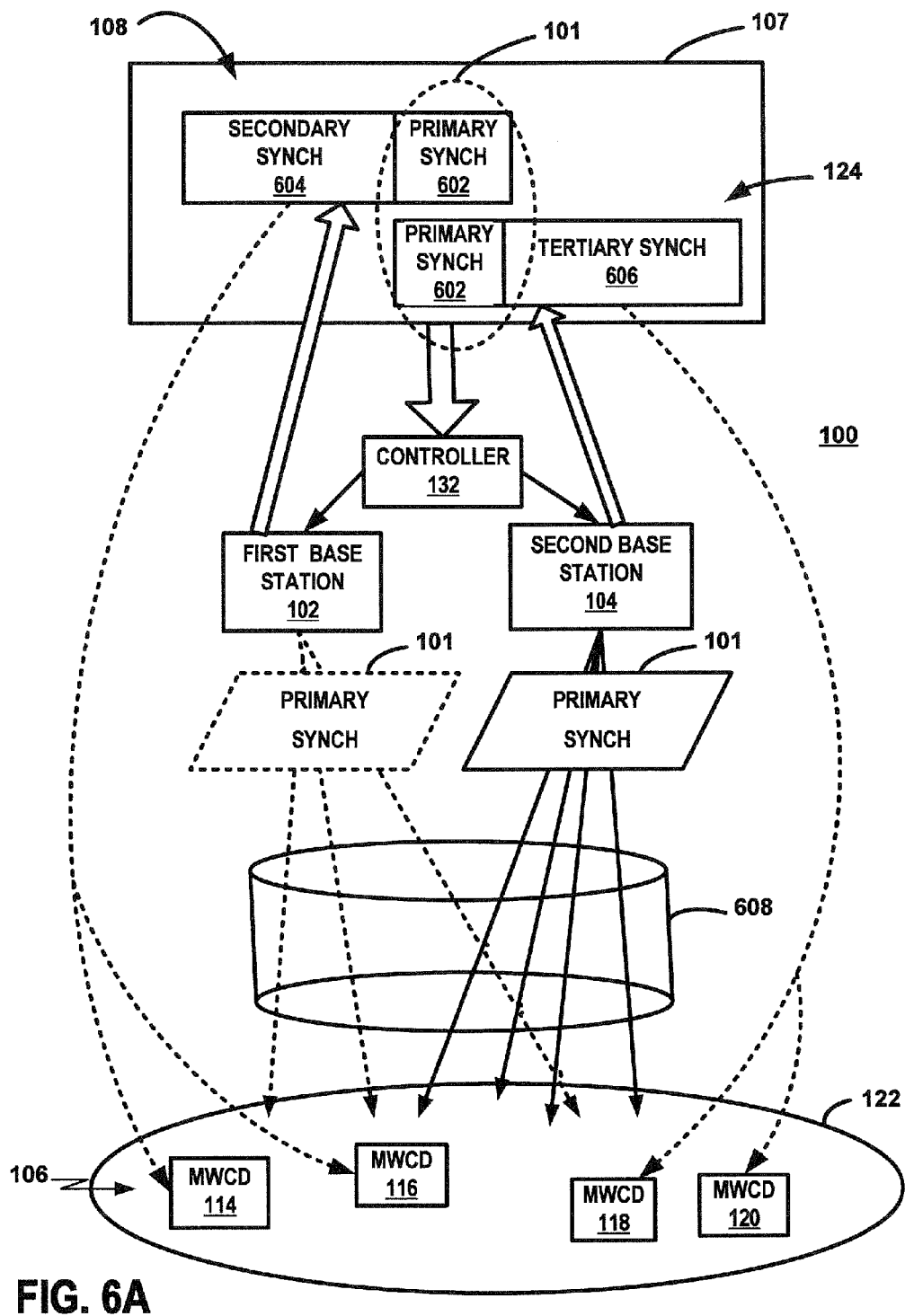
FIG. 6A is a block diagram of the communication system showing transmission of a primary synchronization channel where synchronization information is transmitted in accordance with a hierarchical structure.
Figure 6B:
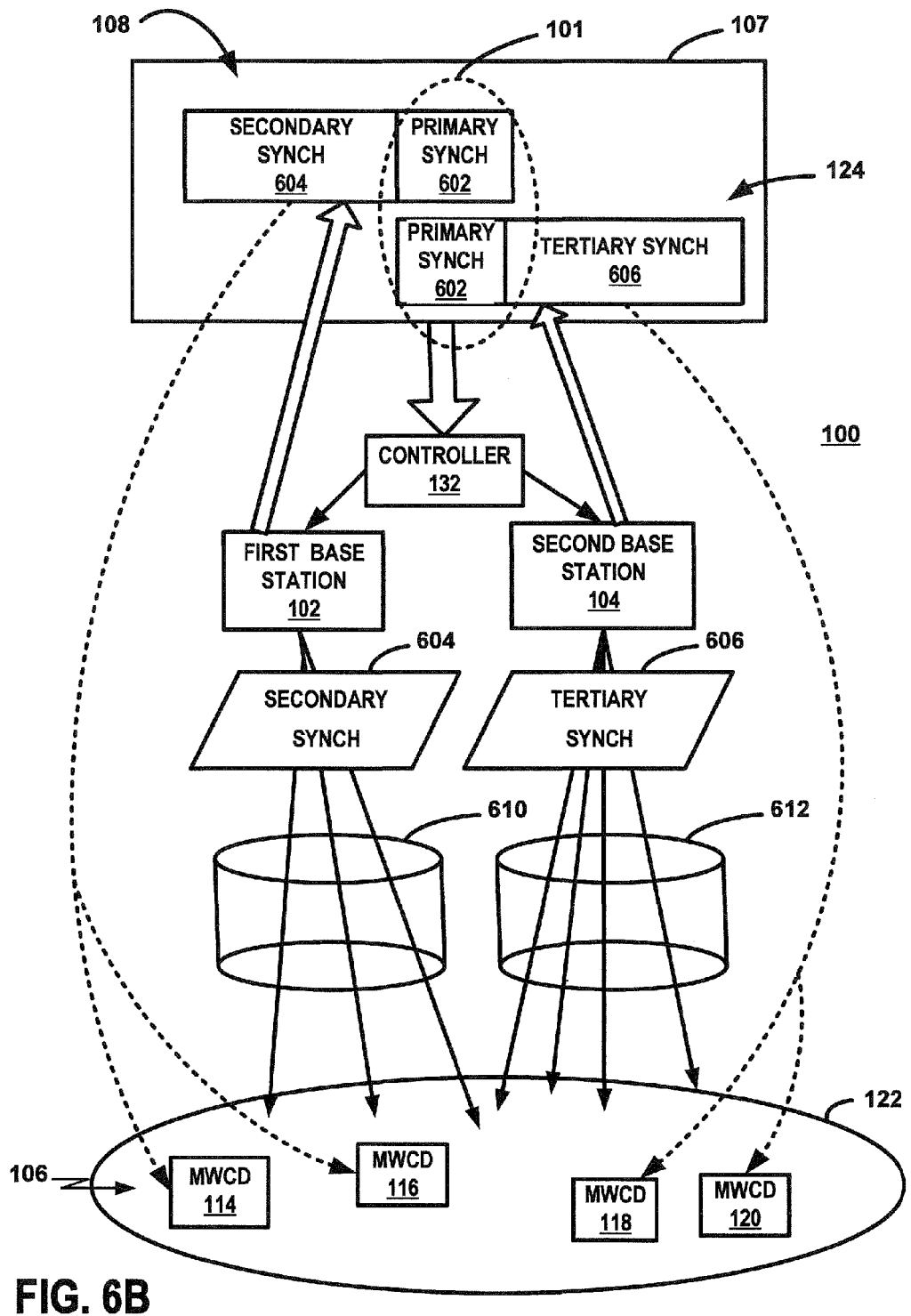
FIG. 6B is a block diagram of the communication system showing transmission of a secondary synchronization channel and a tertiary synchronization channel where the synchronization information is transmitted in accordance with the hierarchical structure.

FIG. 6A is a block diagram of the communication system 100 showing transmission of a primary synchronization information 602 where synchronization information is transmitted in accordance with a hierarchical structure. FIG. 6B is a block diagram of the communication system 100 showing transmission of a secondary synchronization information 604 and a tertiary synchronization information 606 where the synchronization information is transmitted in accordance with the hierarchical structure. The system and method described with reference to FIG. 6A and FIG. 6B provides an example of the control channel system discussed above where the common control information 101 includes primary synchronization information 602, the first control information 128 includes secondary synchronization information 604 and the second control information 130 includes tertiary synchronization information 606.

The primary synchronization information 602 includes relatively course information required by at least all of the wireless communication devices in the overlap region 122. The secondary synchronization information 604 is information required by the wireless communication devices receiving 114, 116 (or attempting to acquire) service from the first base station 102. The secondary synchronization information 604 may also include information that facilitates reception of the tertiary synchronization information 606 by the wireless communication devices receiving 118, 120 (or attempting to acquire) service from the second base station 104. The secondary synchronization information 604 provides a level of synchronization resolution that is higher information than the primary synchronization information 602. In other words, the secondary synchronization information 604 is less course (finer) than the primary synchronization information 602. The tertiary synchronization information 606 has the same or higher level of resolution (same or finer) than the secondary synchronization information 604 and includes information required for communication with the second base station 104 by the wireless communication devices receiving 118, 120 (or attempting to acquire) service from the second base station 104.

The primary synchronization information 602 is transmitted by at least one of the base stations 102, 104. For the example discussed below, the primary synchronization information 602 is transmitted by both base stations 102, 104. The controller 132 assigns the resources of the physical channel for transmitting the primary synchronization information 602. A primary synchronization channel 608 which is a time-frequency physical channel that is part of the physical channelphysical channel 110 is assigned for transmitting the primary synchronization information 602. The controller 132 assigns the appropriate power weightings for transmission through the channel 608.

The secondary synchronization information 604 is transmitted by at least one of the base stations 102, 104. For the example discussed below, the primary synchronization information 602 is only transmitted by the first base station. The controller 132 assigns the resources of the physical channel for transmitting the secondary synchronization information 604. A secondary synchronization channel 610 which is a time-frequency physical channel that is part of the physical channel 110 is assigned for transmitting the secondary synchronization information 604. The controller 132 assigns the appropriate power weightings for transmission through the channel 610.

The tertiary synchronization information 606 is transmitted by at least one of the base stations 102, 104. For the example discussed below, the tertiary synchronization information 606 is only transmitted by the second base station 104. The controller 132 assigns the resources of the physical channel for transmitting the tertiary synchronization information 606. A tertiary synchronization channel 612 which is a time-frequency physical channel that is part of the physical channel 110 is assigned for transmitting the tertiary synchronization information 606. The controller 132 assigns the appropriate power weightings for transmission through the channel 612.

In the hierarchical synchronization information structure, the primary synchronization information is used to obtain subframe-level timing and the secondary synchronization information is used to obtain frame-level timing. Both the primary synchronization information and the secondary synchronization information consist of a sequence (typically a pseudo-random sequence) that is transmitted periodically over a fixed set of subcarriers and time (resource elements). The receiver in the mobile device detects these synchronization channels using correlation. If the sequence is sector-specific (e.g. the cell-ID is embedded in the sequence) then the receiver can perform an exhaustive search.

Figure 7:
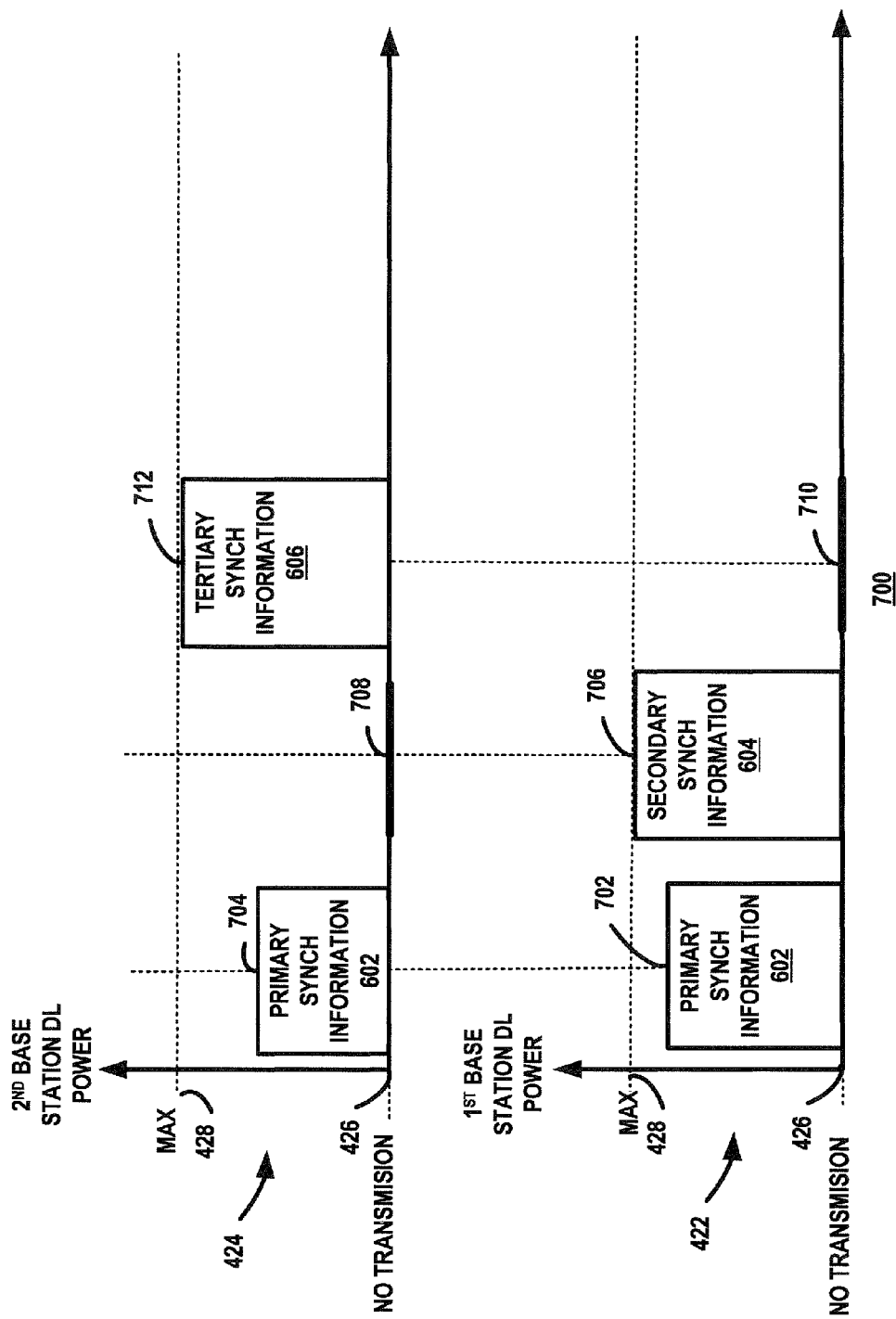
FIG. 7 is a graphical representation of an example of transmission power weightings of the transmissions of the synchronization information from the two base stations.

FIG. 7 is a graphical representation 700 of an example of transmission power weightings 702, 704, 706, 708, 710, 712 of the transmissions 422, 424 of the synchronization information from the two base stations 102, 104. The controller 132 selects a power weighting 702, 704 for transmitting signals that will include the primary synchronization information 602 from each base station 102, 104 at power weightings between no power 426, where there is no transmission of the signal, to a maximum power weighting 428. For the example of FIG. 7, therefore, the transmission 422 from the first base station 102 includes a primary synchronization signal 602 that has a power weighting 702 less than the maximum 426. The transmission 424 from the second base station 104 includes a primary synchronization signal 602 that has a power weighting 704 less than the maximum 426 but different than the power weighting 702 from the first base station 102.

The controller 132 selects a power weighting 706, 708 for transmitting signals that will include the secondary synchronization information 604 from each base station 102, 104 at power weightings between a minimum weighting 426, where there is no transmission of the signal, to a maximum power weighting 428. For the example of FIG. 7, therefore, the transmission 422 from the first base station 102 includes a secondary synchronization signal 604 that has a power weighting 706 at the maximum 428. The transmission 424 from the second base station 104 does not include a secondary synchronization signal 604. Accordingly, the power weighting 708 of the secondary synchronization signal 604 transmitted from the second base station is zero power. Transmitting the information at a zero weighting can be achieved by not assigning the information to any subcarriers for transmission.

The controller 132 selects a power weighting 710, 712 for transmitting signals that will include the tertiary synchronization information 606 from each base station 102, 104 at power weightings between a zero power weighting 426, where there is no transmission of the information, to a maximum power weighting 428. For the example of FIG. 7, therefore, the transmission 424 from the second base station 104 includes a tertiary synchronization signal 606 that has a power weighting 712 at the maximum 428. The transmission 424 from the first base station 102 does not include a tertiary synchronization signal 606. Accordingly, the power weighting 710 of the tertiary synchronization signal 604 transmitted from the first base station is a zero weighting (no transmission).

Numerous other transmission schemes and power weighting can be used based on the particular communication system 100 and situation. Power weighting for synchronization signals as with other control channels are typically determined at the time of system deployment. Power weighting may be dynamic, however, in some situations.

Figure 8:
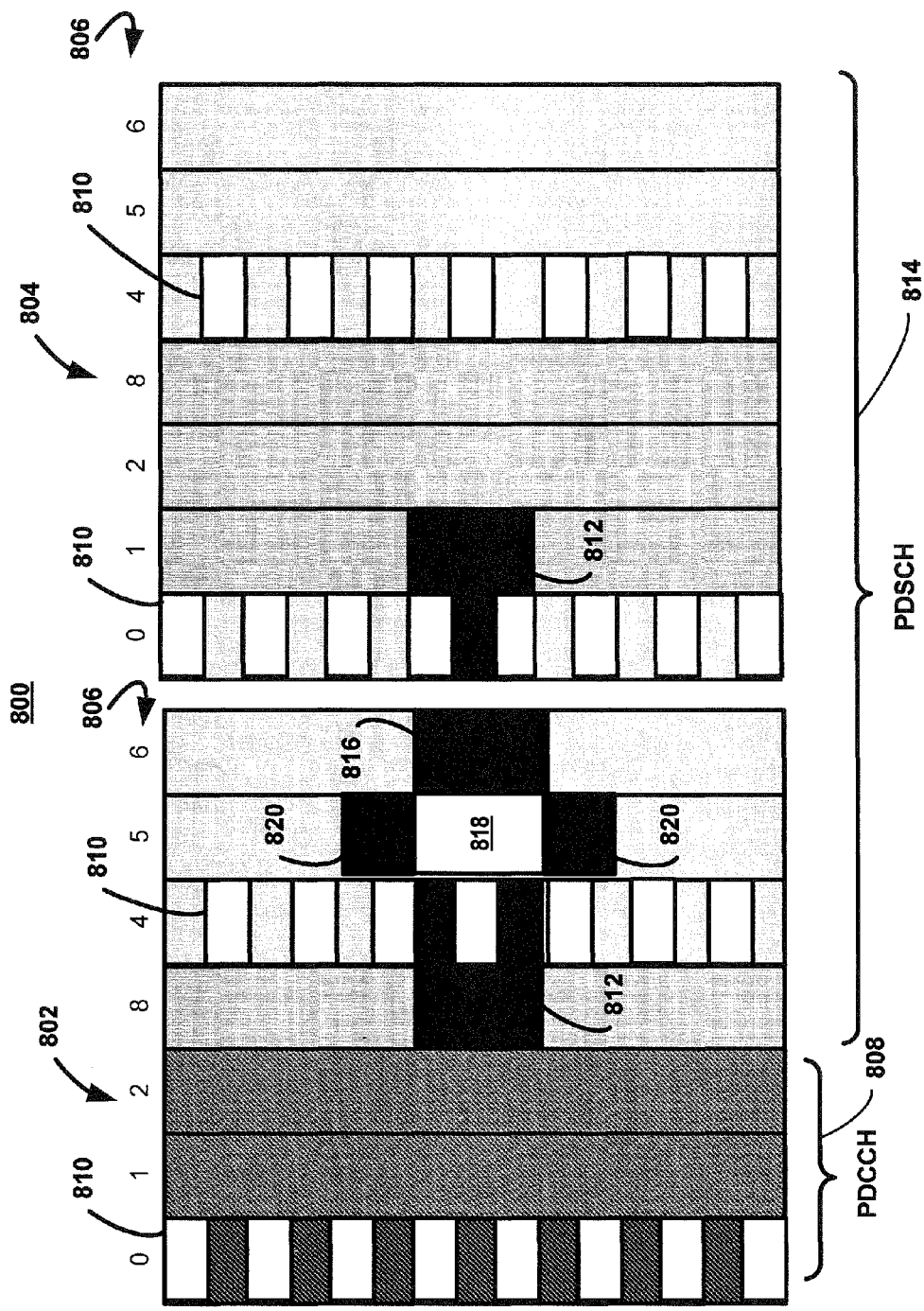
FIG. 8 is an illustration of a subframe that includes a tertiary synchronization channel in accordance with a 3GPP LTE communication specification.

FIG. 8 is an illustration of a subframe 800 that includes a tertiary synchronization channel in accordance with a 3GPP LTE communication specification. The subframe 800 includes two slots 802, 804, where each slot includes seven symbol times 806. The symbol times 0, 1 and 2 in the first slot 802 form the physical channel 506 which is a Physical Downlink Control Channel (PDCCH) 808. Pilot signals (or Reference Signals) 810 are injected at symbol times 0 and 4. The subframe 800 includes a channel that is a Physical Broadcast Channel (PBCH) 812 and spans portions of symbol times 3 and 4 of the first slot 802 and portions of symbol times 0 and 1 of the second slot 804. The data channel 502 is a Physical Downlink Shared Channel (PDSCH) 814 and is covered by the remainder of symbol times 3-6 of the first slot 802 and symbol times 1-6 of the second slot 804. The sub-frame 800 also includes a primary synchronization channel (P-SCH) 816 and a secondary synchronization channel (S-SCH) 818 as well as a tertiary synchronization channel 820. Conventional systems include only a primary synchronization channel (P-SCH) 816 and a secondary synchronization channel (S-SCH) 818. The tertiary synchronization channel 820 in the example is shown as two resource blocks adjacent to the S-SCH 818. The tertiary synchronization channel 820, however, may be defined within other time-frequency resources within the subframe 800. The distribution and assignment of resource elements depicted in FIG. 8 are provided as an example. Other combinations of resource blocks and resource elements may be used. Although the example illustrates the use of non-consecutive resource elements, there may be advantages to assigning consecutive resource to the tertiary synchronization information.

Figure 9:
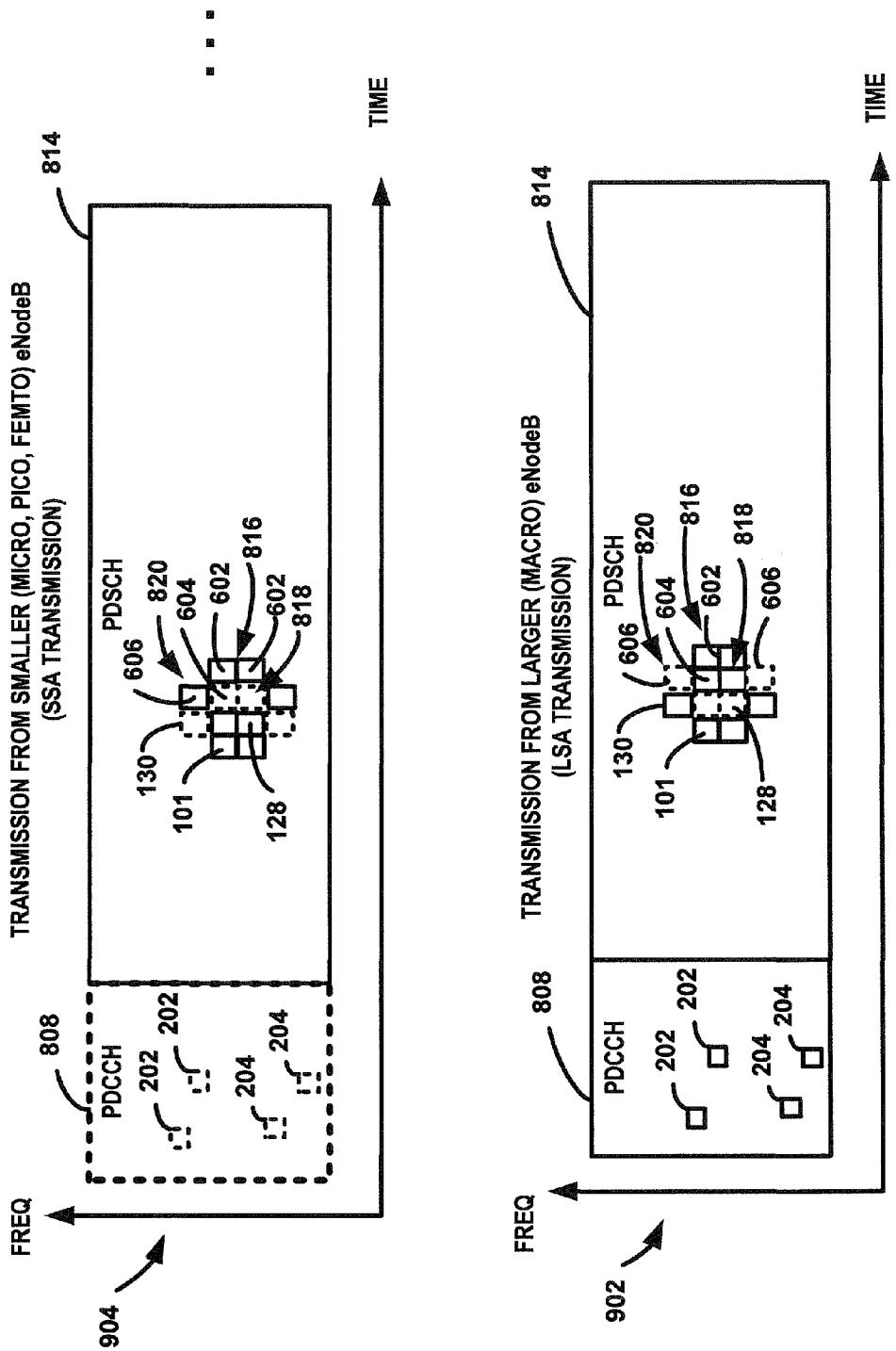
FIG. 9 illustrates an example consistent with the power allocation shown in FIG. 6.

FIG. 9 is graphical illustration 900 of the transmissions 902, 904 where the first base station 102 and the second base station 104 operate in accordance with a 3GPP LTE communication specification. For the example of FIG. 9, the first base station 102 is an eNodeB with a LSA geographical service area 304 greater than SSA geographical service area 306 of an eNodeB that is operating as the second base station 104. Accordingly, the LSA eNodeB, such a macro eNodeB has a larger service area than the SSA eNodeB such as a Micro eNodeB, Pico eNodeB, or Femto eNodeB.

For the example of FIG. 9, the first base station transmission is the larger service area eNodeB transmission (LSA transmission) 904 and the second base station transmission is the smaller service area eNodeB transmission (SSA transmission) 904 where the transmissions are formatted and transmitted in accordance with the 3GPP LTE communication specification. Therefore, the physical device-specific control channel is a Physical Downlink Control Channel (PDCCH) 808 and the data channel is a Physical Downlink Shared Channel (PDSCH) 814 for this example. The common control information 101, the first control information 128 and the second control information 130 are transmitted over the BCH 812. The primary synchronization information 502 is transmitted over the P-SCH 816 and the secondary synchronization information 504 is transmitted over the S-SCH 818. The tertiary synchronization information 506 is transmitted over the tertiary synchronization channel 820.

FIG. 9 illustrates an example consistent with the power allocation shown in FIG. 6. For example, the resource elements representing the P-SCH 1 with the primary synchronization information 602 are represented with sold-line blocks in both transmissions to illustrate that the signals are transmitted from both base stations (eNodeBs) 102, 104. The resource elements representing the S-SCH with the secondary synchronization information 604 are represented with sold-line blocks in the first base station transmission 902 and with dashed lines in the second base station transmission 904 to illustrate that the signals are transmitted only from the first base station (LSA eNodeB) 102. The resource elements representing the tertiary synchronization channel 820 with the tertiary synchronization information 606 are represented with sold-line blocks in the second base station transmission (SSA transmission) 904 and with dashed lines in the first base station transmission (LSA transmission) 902 to illustrate that the signals are transmitted only from the second base station (SSA eNodeB) 104.

For the example, the secondary synchronization information and the tertiary synchronization information are allocated orthogonal resources for transmission by one of the base stations. The primary synchronization information is transmitted over the same, non-orthogonal, resource from both base stations.

The above transmission scheme for synchronization information provides an example of transmission schemes that can be used for any control channel signal. Accordingly, a control channel signal transmitted by one base station is allocated a specific power-weighting of an orthogonal or non-orthogonal F-T resources based on deployment, conditions, purpose, and the control channel use relative to another control channel signal transmitted by another base station.

Figure 10:
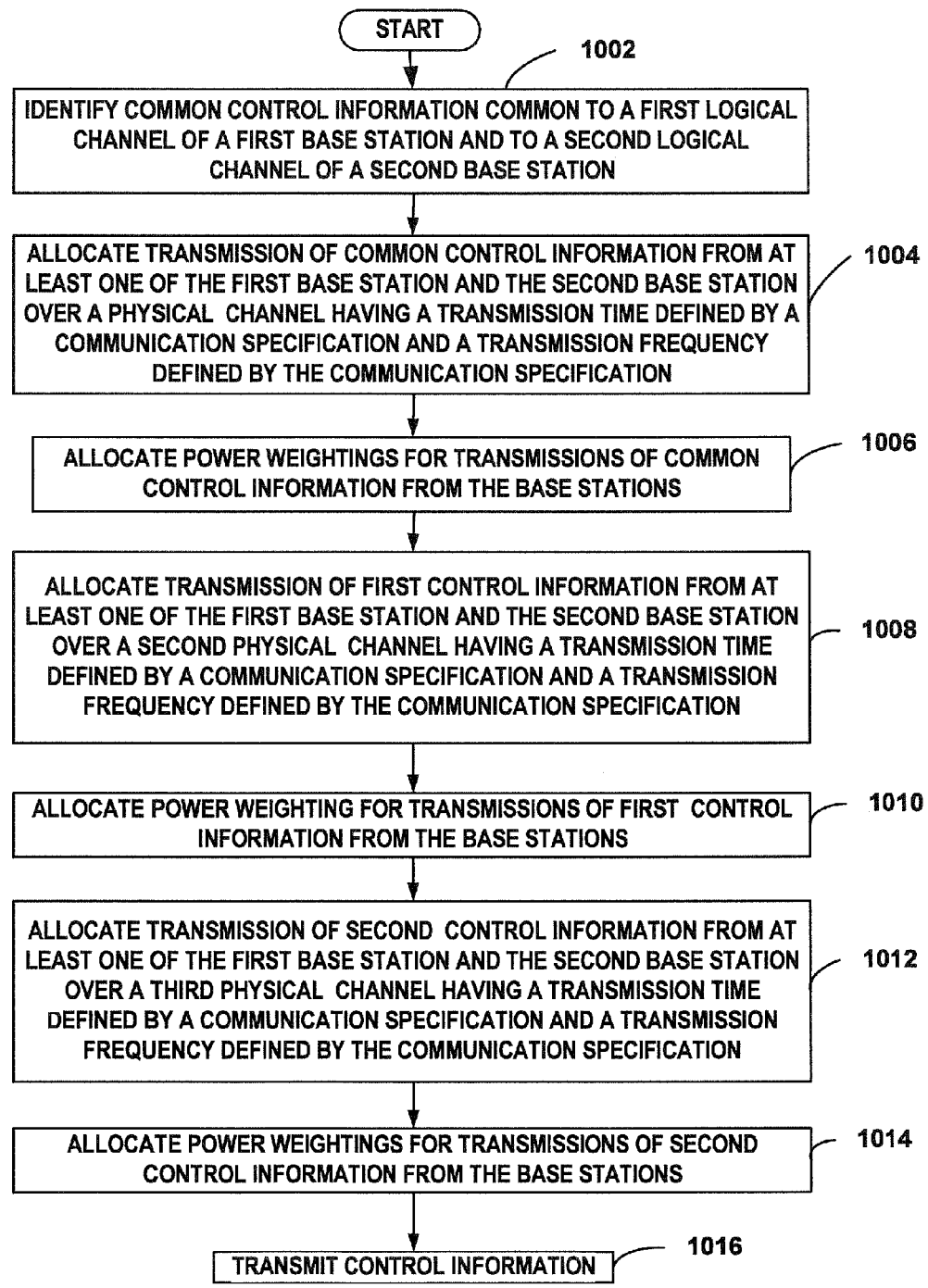
FIG. 10 is a flow chart of a method performed in the communication system.

FIG. 10 is a flow chart of a method performed in the communication system 100. Although the method may be performed using any combination of code and/or hardware, the method is facilitated by executing code on the controller 132 in the exemplary embodiment.

At step 1002, the common control information 101 is identified. The controller 132 determines what information of the first logical channel 108 is the same as the information in the second logical channel 124.

At step 1004, transmission of the common control information 101 is allocated from at least one of the first base station 102 and the second base station 104. The common control information 101 is allocated for transmission from one or both of the base station 102, 104 over the physical channel 110. As discussed above, the physical channel 110 has defined time and frequency resources. Where the common control information 101 is allocated for transmission over both base stations 102, 104, the transmission is allocated from both base stations over the physical channel 110.

At step 1006, power weightings for transmitting the common control information 101 are allocated. As discussed above, the controller 132 determines appropriate power weightings for transmitting the common control information 101 from each base station 102, 104. In some cases, the common control information 101 is only transmitted from one base station and the power weighting for transmission from the other base station is zero power (no power). The power weightings are typically determined at the time of system deployment and are at least partially based on the distance between the base stations 102, 104. In some situations the power weightings may be dynamically adjusted based on other factors.

At step 1008, transmission of the first control information 128 is allocated for transmission from at least one of the first base station 102 and the second base station 104. The first control information 128 is allocated for transmission from one or both of the base station 102, 104 over the second physical channel 134. As discussed above, the second physical channel 134 has time and frequency resources defined by a communication specification. Where the first control information 128 is allocated for transmission over both base stations 102, 104, the transmission is allocated from both base stations over the second physical channel 134.

At step 1010, power weightings for transmitting the first control information 128 are allocated. As discussed above, the controller 132 determines appropriate power weightings for transmitting the first control information 128 from each base station 102, 104. In some cases, the first control information 12 is only transmitted from one base station and the power weighting for transmission from the other base station is zero power (no power). The power weightings are typically determined at the time of system deployment and are at least partially based on the distance between the base stations 102, 104. In some situations the power weightings may be dynamically adjusted based on other factors.

At step 1012, transmission of the second control information 130 is allocated for transmission from at least one of the first base station 102 and the second base station 104. The second control information 130 is allocated for transmission from one or both of the base station 102, 104 over the third physical channel 136. As discussed above, the third physical channel 136 has time and frequency resources defined by a communication specification. Where the second control information 130 is allocated for transmission over both base stations 102, 104, the transmission is allocated from both base stations over the third physical channel 136.

At step 1014, power weightings for transmitting the second control information 128 are allocated. As discussed above, the controller 132 determines appropriate power weightings for transmitting the second control information 130 from each base station 102, 104. In some cases, the second control information 130 is only transmitted from one base station and the power weighting for transmission from the other base station is a zero weighting (no transmission). The power weightings are typically determined at the time of system deployment and are at least partially based on BER of a combined signal received at a mobile communication device within the overlap region. In some situations the power weightings may be dynamically adjusted based on the same criteria as well as other factors.

At step 1016, the control information is transmitted at the allocated power weightings and base station(s).

Figure 11:
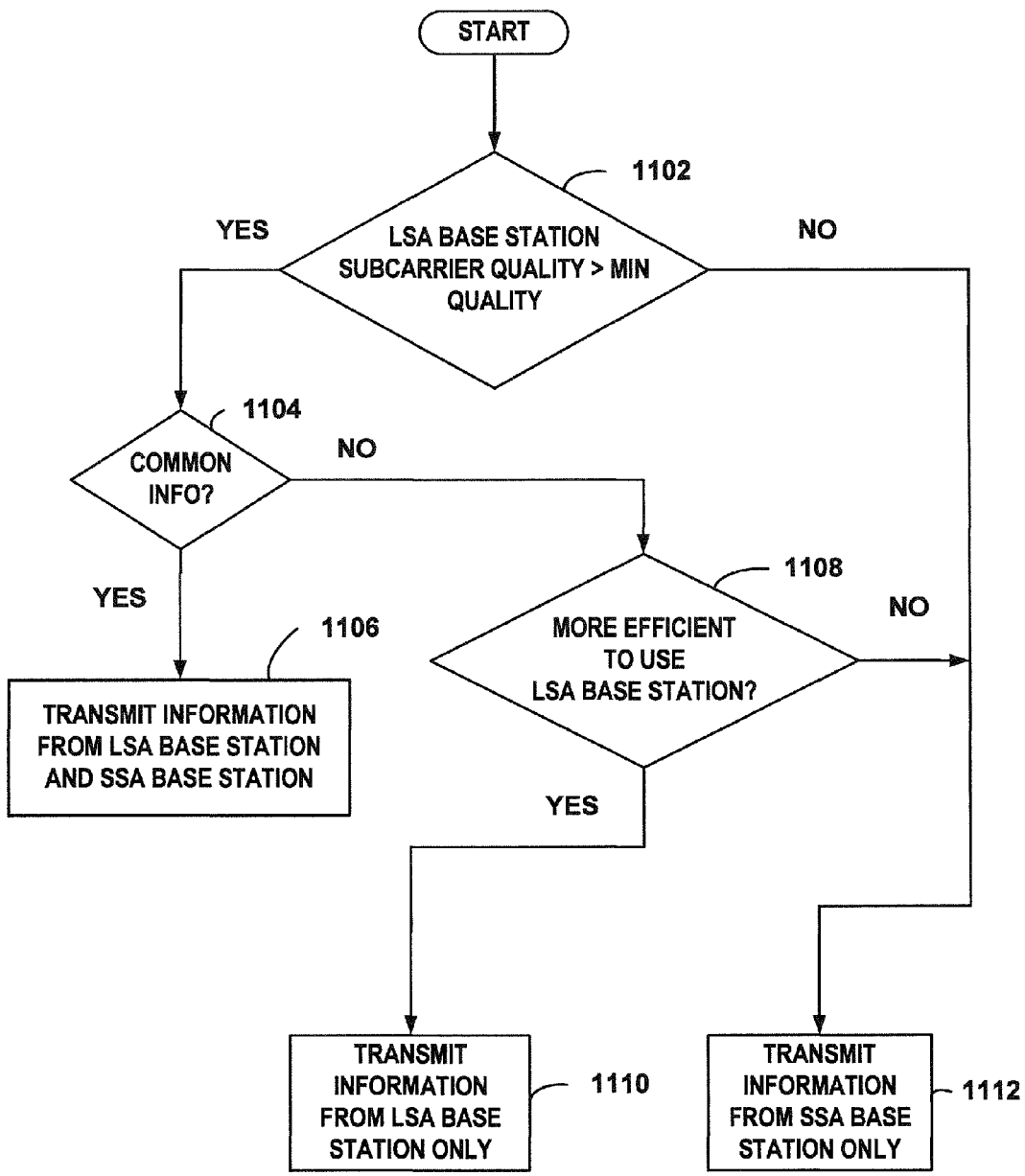
FIG. 11 is a flow chart of an example of a method for allocating transmission of control information from multiple base stations within a communication system.

FIG. 11 is a flow chart of an example of a method for allocating transmission of control information from multiple base stations within a communication system 100. The method discussed with reference to FIG. 11 is facilitates management of communication with a mobile device within the overlap region. The method includes a decision process for a mobile device within the SSA coverage area that is also capable of receiving LSA base station downlink (DL) signals.

At step 1102, it is determined whether the subcarriers transmitted from the LSA base station are received by the mobile communication device at a sufficient quality. The controller compares quality data such as BER, signal to noise (SNR) ratios or other parameters reported by the mobile communication device to a quality threshold. If the quality is no sufficient, the method proceeds to step 1102, where the information is transmitted from the SSA base station. If the quality is sufficient, the method continues at step 1104.

At step 1104, it is determined whether the information to be transmitted is common information. The controller determines if the information to be transmitted is contained within the logical control channels of both the LSA base station and the SSA base station. If the information is not common information, the method proceeds to step 1108. Otherwise, the method continues at step 1106.

At step 1106, the common information is transmitted from both the SSA base station and the LSA base station. The controller determines the appropriate weightings for each set of sub carriers for transmission from each base station and transmits the common information.

At step 1108, it is determined whether transmission of the information from the LSA base station is more efficient than transmission of the information from the SSA base station. If transmission is more efficient from the LSA base station, the method continues at step 1110. Otherwise the method continues at step 1112 where the information is transmitted only from the SSA base station.

At step 1110, the information is transmitted only from the LSA base station. Accordingly, resources are efficiently allocated for transmitting of information based on the quality received signals at the mobile communication device, the relative efficiency transmission from each base station, and the type of information.

Figure 12:
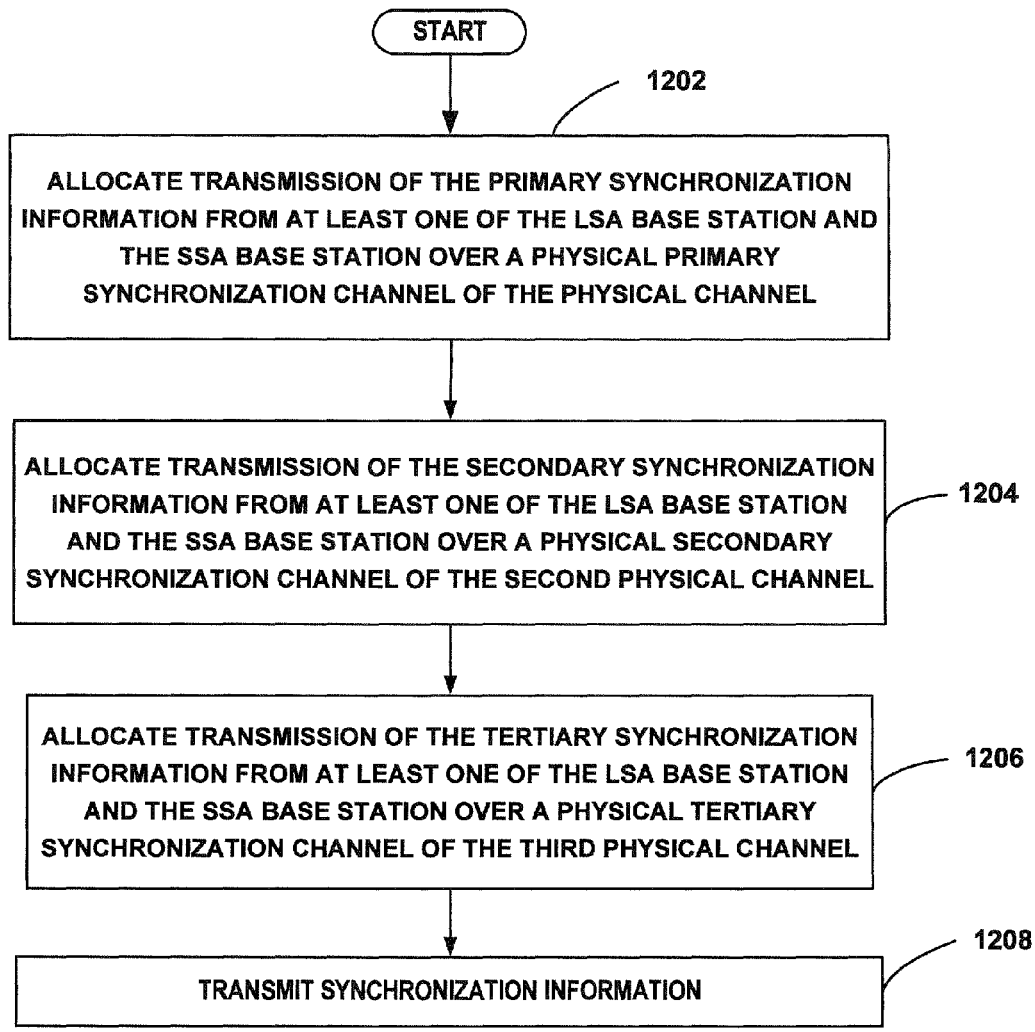
FIG. 12 is a flow chart of a method of transmitting synchronization information within a communication system.

FIG. 12 is a flow chart of a method of transmitting synchronization information within a communication system 100. Although the method may be performed using any combination of code and/or hardware, the method is facilitated by executing code on the controller 132 in the exemplary embodiment.

At step 1202, the primary synchronization information is allocated for transmission from at least one of the first base station and the second base station. For the example, the first base station is a LSA base station and the second base station is a SSA bases station. The transmission is allocated over the physical primary synchronization channel of the physical channel.

At step 1204, the secondary synchronization information is allocated for transmission from at least one of the first base station and the second base station. The transmission is allocated over the physical secondary synchronization channel of the second physical channel. In some situations, the secondary synchronization information includes information that is required for synchronization to the SSA base station. In such a scenario, the physical secondary synchronization channel can be considered to be part of the physical channel.

At step 1206, the tertiary synchronization information is allocated for transmission from at least one of the first base station and the second base station. The transmission is allocated over the physical tertiary synchronization channel of the third physical channel.

At step 1208, the synchronization information is transmitted. As described above, an example of a transmission scheme includes transmitting the primary synchronization information over the physical primary synchronization channel from both base stations, transmitting the secondary synchronization information from the LSA base station over the physical secondary synchronization channel, and transmitting the tertiary synchronization information from the SSA base station over the physical tertiary synchronization channel.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A system comprising:
a large service area (LSA) base station having a LSA geographical service area and configured to exchange communication data with first mobile communication devices and assigned a first logical control channel comprising first control information for the first mobile communication devices;
a small service area (SSA) base station having a SSA geographical service area at least partially overlapping the LSA geographical service area to form an overlap service region, the SSA base station configured to exchange other communication data with second mobile devices and assigned a second logical control channel comprising second control information for the second mobile communication devices, the first logical control channel and the second logical control channel further comprising common control information, wherein the first mobile communication devices and the second mobile communication devices are within the overlap region; and
a controller configured to allocate transmission of the common control information from at least one of the LSA base station and the SSA base station over a physical channel having a transmission time defined by a communication specification and a transmission frequency defined by the communication specification, wherein, if both base stations are allocated to transmit the common control information, both base stations are allocated to transmit the common control information over the physical channel.

2. The system of claim 1, wherein the controller is further configured to assign a first transmission power weighting for transmitting the common control information from the LSA base station and a second transmission power weighting for transmitting the common control information from the SSA base station.

3. The system of claim 2, wherein the controller is configured to assign the first transmission power weighting and the second transmission power weighting at least partially based on a bit error rate (BER) of a combined signal representing the common control information at a receiving mobile communication device within the overlap service region.

4. The system of claim 3, wherein the BER is a predicted and calculated BER for mobile communication devices within the overlap region.

5. The system of claim 3, wherein the BER is a measured BER of the combined signal after the receiving mobile communication device combines transmissions from the LSA base station and the SSA base station to generate the combined signal.

6. The system of claim 1, wherein the controller is further configured to allocate transmission of the first control information from at least one of the LSA base station and the SSA base station over a second physical channel having a second defined transmission time and a second defined transmission frequency, wherein, if both base stations are allocated to transmit the first control information, both base stations are allocated to transmit the first control information over the second physical channel.

7. The system of claim 6, wherein the controller is further configured to assign, a LSA control information transmission power weighting for transmitting the first control information from the LSA base station and a SSA control information transmission power weighting for transmitting the first control information from the SSA base station, the transmission weightings selected from a range of weightings from a minimum weighting resulting in no transmission to a maximum power weighting.

8. The system of claim 1, wherein the first control information is not allocated for transmission from the SSA base station and the SSA base station refrains from transmitting any signals over the second physical channel.

9. The system of claim 6, wherein the controller is further configured to allocate transmission of the second control information from at least one of the LSA base station and the SSA base station over a third physical channel having a third defined transmission time and a third defined transmission frequency, wherein, if both base stations are allocated to transmit the second control information, both base stations are allocated to transmit the second control information over the third physical channel.

10. The system of claim 9, wherein the first control information is not allocated for transmission from the SSA base station and the SSA base station refrains from transmitting any signals over the second physical channel.

11. The system of claim 1, wherein the common control information is not allocated for transmission from the SSA base station and the SSA base station refrains from transmitting any signals over the physical channel.

12. The system of claim 1, wherein:
the first logical control channel comprises a first logical synchronization channel comprising:
primary synchronization information for synchronizing the first mobile communication devices and the second mobile communication devices to the LSA base station and the SSA base station; and
secondary synchronization information synchronizing the first mobile communication devices to the LSA base station;
wherein the second logical control channel comprises:
a second logical synchronization channel comprising the primary synchronization information and tertiary synchronization information for the second mobile communication devices to synchronize to the SSA base station; and
wherein the controller is further configured to allocate transmission of the primary synchronization information from at least one of the LSA base station and the SSA base station over a physical primary synchronization channel of the control channel, wherein if the primary synchronization information is allocated for transmission from both base stations, the LSA base station and the SSA base station are allocated transmission of the primary synchronization information over the physical primary synchronization channel of the physical channel.

13. A system comprising:
a large service area (LSA) base station having a LSA geographical service area and configured to exchange communication data with first mobile communication devices in an overlap service region, the LSA assigned a first logical control channel comprising first control information for the first mobile communication devices; and
a small service area (SSA) base station having a SSA geographical service area at least partially overlapping the LSA geographical service area to form the overlap service region, the SSA base station configured to exchange other communication data with second mobile communication devices in the overlap service region, the SSA base station assigned a second logical control channel comprising second control information for the second mobile communication devices, the first logical control channel and the second logical control channel further comprising common control information common to both the first logical control channel and the second logical control channel;
the LSA base station configured to transmit the common control information over a physical channel having a transmission time defined by a communication specification and a transmission frequency defined by the communication specification, wherein, if the SSA base station transmits the common control information, SSA base station transmits the common control information over the physical channel.

14. The system of claim 13, wherein the controller is further configured to assign a first transmission power weighting for transmitting the common control information from the LSA base station and a second transmission power weighting for transmitting the common control information from the SSA base station.

15. The system of claim 14, wherein the controller is configured to assign the first transmission power weighting and the second transmission power weighting at least partially based on a bit error rate (BER) of a combined signal representing the common control information at a receiving mobile communication device within the overlap service region.

16. The system of claim 13, wherein the SSA base station is configured to transmit the first control information over a second physical channel having a second defined transmission time and a second defined transmission frequency, wherein, if the LSA base station transmits the first control information, the LSA base station is configured to transmit the first control information over the second physical channel.

17. The system of claim 16, wherein the LSA base station is configured to transmit the second control information over a third physical channel having a third defined transmission time and a third defined transmission frequency, wherein, if the SSA base station transmits the second control information, the SSA base station is configured to transmit the second control information over the third physical channel.

18. The system of claim 13, wherein:
the first logical control channel comprises a first logical synchronization channel comprising:
primary synchronization information for synchronizing the first mobile communication devices and the second mobile communication devices to the LSA base station and the SSA base station; and
secondary synchronization information for at least the first mobile communication devices to synchronize to the LSA base station;
wherein the second logical control channel comprises:
a second logical synchronization channel comprising the primary synchronization information and tertiary synchronization information for at least the second mobile communication devices to synchronize to the SSA base station; and
wherein the controller is further configured to allocate transmission of the primary synchronization information from at least one of the LSA base station and the SSA base station over a physical primary synchronization channel of the control channel, wherein if both base stations are allocated transmission of the primary synchronization information, the LSA base station and the SSA base station are allocated transmission of the primary synchronization information over the physical primary synchronization channel of the physical channel.

19. A method comprising:
allocating transmission of common control information from at least one of a large service area (LSA) base station and a small service area (SSA) base station over a physical channel having a transmission time defined by a communication specification and a transmission frequency defined by the communication specification, the LSA base station having a LSA geographical service area and configured to exchange communication data with first mobile communication devices in an overlap service region and assigned a first logical control channel comprising first control information for the first mobile communication devices, the SSA base station having a SSA geographical service area at least partially overlapping the LSA geographical service area to form the overlap service region, the SSA base station configured to exchange other communication data with second mobile communication devices in the overlap service region and assigned a second logical control channel comprising second control information for the second mobile communication devices, the first logical control channel and the second logical control channel further comprising the common control information; and if both base stations are allocated to transmit the common control information, allocating both base stations to transmit the common control information over the physical channel.

20. The method of claim 19, further comprising:
assigning a first transmission power weighting for transmitting the common control information from the LSA base station and a second transmission power weighting for transmitting the common control information from the SSA base station.

21. The method of claim 20, wherein the assigning comprises assigning the first transmission power weighting and the second transmission power weighting at least partially based on a bit error rate (BER) of a combined signal representing the common control information at a receiving mobile communication device within the overlap service region.

22. The method of claim 20, further comprising:
allocating transmission of the first control information from at least one of the LSA base station and the SSA base station over a second physical channel having a second defined transmission time and a second defined transmission frequency; and
if both base stations are allocated to transmit the first control information, allocating both base stations to transmit the first control information over the second physical channel.

23. The method of claim 22, further comprising:
assigning, based, at least partially, on the distance between the LSA base station and the SSA base station, a first control information transmission power weighting for transmitting the first control information from the LSA base station and a SSA control information transmission power weighting for transmitting the first control information from the SSA base station, the transmission power weightings selected from a range of power from no transmission to a maximum power weighting.

24. The method of claim 23, further comprising:
allocating transmission of the second control information from at least one of the LSA base station and the SSA base station over a third physical channel having a third defined transmission time and a third defined transmission frequency; and
if both base stations are allocated to transmit the second control information, allocating both base stations to transmit the second control information over the third physical channel.

25. The method of claim 19, further comprising:
refraining from transmitting any signals over the physical channel from the SSA base station.

26. The method of claim 19, wherein:
the first logical control channel comprises a first logical synchronization channel comprising:
primary synchronization information for synchronizing to the LSA base station and the SSA base station; and
secondary synchronization information for synchronizing at least the first mobile communication devices to the LSA base station;
the second logical control channel comprises the primary synchronization information and tertiary synchronization information for synchronizing to the SSA base station; the method further comprising:
allocating transmission of the primary synchronization information from at least one of the LSA base station and the SSA base station over a physical primary synchronization channel of the physical channel; and
if transmission of the primary synchronization information is allocated from the LSA base station and the SSA base station, allocating transmission of the primary synchronization information from both the LSA base station and the SSA base station over the physical primary synchronization channel of the physical channel.

* * * * *